United States Patent
Li et al.

(10) Patent No.: US 10,601,530 B2
(45) Date of Patent: Mar. 24, 2020

(54) METHOD FOR GENERATING MEASUREMENT RESULT AND DEVICE

(71) Applicant: Huawei Technologies Co., Ltd., Shenzhen (CN)

(72) Inventors: Guorong Li, Shenzhen (CN); Lili Zhang, Beijing (CN); Aimin Justin Sang, San Diego, CA (US); Richard Stirling-Gallacher, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/345,057

(22) PCT Filed: Oct. 26, 2016

(86) PCT No.: PCT/CN2016/103448
§ 371 (c)(1),
(2) Date: Apr. 25, 2019

(87) PCT Pub. No.: WO2018/076216
PCT Pub. Date: May 3, 2018

(65) Prior Publication Data
US 2019/0280790 A1    Sep. 12, 2019

(51) Int. Cl.
*H04L 5/12* (2006.01)
*H04B 17/382* (2015.01)
(Continued)

(52) U.S. Cl.
CPC .......... *H04B 17/382* (2015.01); *H04B 7/043* (2013.01); *H04B 7/0408* (2013.01);
(Continued)

(58) Field of Classification Search
CPC .. H04B 17/382; H04B 17/318; H04B 7/0408; H04B 7/0695; H04W 24/10; H04W 36/30
(Continued)

(56) References Cited

U.S. PATENT DOCUMENTS

| 7,003,290 B1 * | 2/2006 | Salonaho | H04L 1/0028 455/423 |
| 8,442,513 B2 * | 5/2013 | Krishnamurthy | H04B 17/24 455/422.1 |

(Continued)

FOREIGN PATENT DOCUMENTS

| CN | 103546929 A | 1/2014 |
| CN | 103875191 A | 6/2014 |

(Continued)

OTHER PUBLICATIONS

Zhang, Pu et al., "Hanover algorithm for LTE system", Journal of Xi'An University of Posts and Telecommunications, vol. 115, No. 13, May 2010, 8 pages.

(Continued)

*Primary Examiner* — Helene E Tayong
(74) *Attorney, Agent, or Firm* — Slater Matsil, LLP

(57) ABSTRACT

A method for generating a measurement result, and a device are provided, and the method includes: receiving, by a terminal on a receive beam for each cell, a reference signal sent on a transmit beam of a corresponding cell, and measuring the received reference signal to obtain at least one group of measurement samples for each cell; processing the at least one group of measurement samples for each cell to obtain at least one initial processing value; processing the at least one initial processing value to obtain at least one target processing value; and reporting, by the terminal, a target processing value that meets a preset reporting rule in the at least one target processing value to a base station as a measurement result, or using, by the terminal itself, the target processing value to evaluate cell quality.

20 Claims, 15 Drawing Sheets

(51) Int. Cl.
| | |
|---|---|
| *H04B 17/318* | (2015.01) |
| *H04B 7/0408* | (2017.01) |
| *H04B 7/0426* | (2017.01) |
| *H04B 7/06* | (2006.01) |
| *H04W 24/10* | (2009.01) |
| *H04W 36/30* | (2009.01) |

(52) U.S. Cl.
CPC ......... *H04B 7/0695* (2013.01); *H04B 17/318* (2015.01); *H04W 24/10* (2013.01); *H04W 36/30* (2013.01)

(58) Field of Classification Search
USPC ......................................................... 375/262
See application file for complete search history.

(56) References Cited

U.S. PATENT DOCUMENTS

| | | | |
|---|---|---|---|
| 2010/0112958 A1 | 5/2010 | Krishnamurthy et al. | |
| 2013/0039345 A1 | 2/2013 | Kim et al. | |
| 2014/0198681 A1* | 7/2014 | Jung | H04B 7/0617 370/252 |
| 2017/0034730 A1* | 2/2017 | Zhang | H04W 24/08 |
| 2017/0201893 A1 | 7/2017 | Seol et al. | |
| 2017/0207845 A1* | 7/2017 | Moon | H04B 7/088 |
| 2017/0265111 A1* | 9/2017 | Fan | H04W 36/0094 |

FOREIGN PATENT DOCUMENTS

| | | |
|---|---|---|
| CN | 104519542 A | 4/2015 |
| CN | 104919715 A | 9/2015 |
| CN | 105790886 A | 7/2016 |

OTHER PUBLICATIONS

3GPP TS 36331 V14.0.0 (Sep. 2016), 3rd Generation Partnership Project;Technical Specification Group Radio Access Network; Evolved Universal Terrestrial Radio Access (E-UTRA);Radio Resource Control (RRC); Protocol specification (Release 14), 644 pages.

3GPP TS 36.300 V13.5.0 (Sep. 2016), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13), 313 pages.

Samsung, "Discussion on Beam Measurement for 5G New Radio Interface in mmWave Frequency Bands", 3GPP TSG RAN WG2 #94, R2-163652, Nanjing, China, May 23-27, 2016, 4 pages.

3GPP TS 36.133 V14.1.0 (Sep. 2016), 3rd Generation Partnership Project;Technical Specification Group Radio Access Network; Evolved Universal Terrestrial Radio Access (E-UTRA); Requirements for support of radio resource management (Release 14), 2226 pages.

* cited by examiner

METHOD FOR GENERATING MEASUREMENT RESULT AND DEVICE

CROSS-REFERENCE TO RELATED APPLICATIONS

This application is a National Stage of International Patent Application No. PCT/CN2016/103448, filed on Oct. 26, 2016, which is hereby incorporated by reference in its entirety.

TECHNICAL FIELD

The present invention relates to the field of communications technologies, and in particular, to a method for generating a measurement result and a device.

BACKGROUND

A measurement result reported by a terminal may be applied to mobility processes such as cell selection, cell reselection, and a cell handover. This is very important for normal system operation and implementation of various functions. Some measurement results may also be used by a network operator to optimize a system.

In a Long Term Evolution (Long Term Evolution, LTE) system, a radio resource management (Radio Resource Management, RRM) measurement result may be used for cell addition, cell deletion, a cell handover, and the like. The RRM measurement result is mainly a measurement result of reference signal quality, for example, reference signal received power (Reference Signal Received Power, RSRP) or reference signal received quality (Reference Signal Received Quality, RSRQ). These reference signals are sent in each subframe by a base station (evolved NodeB, eNB) by using an omnidirectional beam (beam) or by using a wide beam covering an entire sector.

However, when an operating frequency of a network and an operating frequency of a terminal are higher than 6 GHz, as shown in FIG. 1, because of lower diffraction and a higher outdoor or indoor penetration loss, a signal is less capable to propagate across a corner and penetrate a wall. In addition, due to atmospheric or rain attenuation and a higher body loss, signal coverage is further made more vulnerable.

Therefore, an antenna array is enabled to have more and smaller antenna units. Such an antenna array facilitates use of beamforming (beamforming). Many antenna units may be used to form narrow beams to compensate for challenging propagation attributes in high frequencies. Therefore, in a high-frequency network, one cell may be covered by a plurality of narrow high-gain beams. Rotation modes of different beams may overlap to provide stable coverage. There may be dozens of to hundreds of beams to cover different angles. Referring to FIG. 2(a), narrow beams marked by a dark shadow can serve a terminal. In FIG. 2(b), a terminal may be handed over from being served by a beam of a base station below, to being served by a beam of a base station above.

In the prior art, a deployment scenario of an omnidirectional antenna or a wide sector, that is, a deployment scenario related to an omnidirectional beam and a wide sector, is mainly considered, and a deployment scenario related to a narrow beam in a high-frequency network is not considered. In addition, a reference signal in the high-frequency network may also change. Therefore, an existing RRM measurement method and an obtained measurement result are not applicable to the high-frequency network.

SUMMARY

Embodiments of the present invention provide a method for generating a measurement result and a device, which are applicable to a high-frequency network in which a terminal measures reference signal quality and generates a measurement result.

The objective of the present invention is achieved by using the following technical solutions.

According to a first aspect, an embodiment of the present invention provides a method for generating a measurement result, including: receiving, by a terminal on a receive beam for each cell, a reference signal sent on a transmit beam of a corresponding cell, and measuring the received reference signal to obtain at least one group of measurement samples for each cell; processing the at least one group of measurement samples for each cell to obtain at least one initial processing value; processing the at least one initial processing value to obtain at least one target processing value; and finally reporting, by the terminal, a target processing value that meets a preset reporting rule in the at least one target processing value to a base station as a measurement result, or using, by the terminal itself, the target processing value to evaluate cell quality.

Therefore, according to the method provided in this embodiment of the present invention, the terminal may obtain a measurement sample for a beam combination, generate a cell-level measurement result or a beam-level measurement result, and report the measurement result to the base station or use the measurement result to evaluate cell quality. Compared with the prior art, in the method provided in this embodiment of the present invention, a beamforming operation in a high-frequency scenario is considered, measurement samples are obtained for different beam combinations, and filtering and calculation are performed, so that a generated measurement result is more accurate, and the base station can learn of quality of each cell and/or a channel state of a beam, and determine, based on the measurement result reported by the terminal, whether the terminal needs to perform operations such as cell addition, cell deletion, and a cell handover.

In a possible implementation, if a quantity of cell transmit beams measured by the terminal for an ith cell is Mi, and a quantity of receive beams of the terminal for the ith cell is Ni, each group of measurement samples for the ith cell includes Mi*Ni measurement values, and both Mi and Ni are positive integers greater than or equal to 1.

Therefore, the terminal may choose to measure a quantity of transmit beams of the cell to obtain a measurement sample for each beam combination.

In a possible implementation, the processing, by the terminal, the at least one group of measurement samples for each cell means processing, by the terminal, the at least one group of measurement samples for each cell at a physical layer; and/or the processing, by the terminal, the at least one initial processing value means processing, by the terminal, the at least one initial processing value at a radio resource control RRC layer, namely, layer 3.

Therefore, after obtaining the measurement sample, the terminal performs filtering and calculation at the physical layer and/or the RRC layer, so as to obtain a final measurement result.

In a possible implementation, the method for obtaining the at least one initial processing value and/or the method for obtaining the at least one target processing value are/is notified by the base station to the terminal by using preset signaling, where the preset signaling is at least one of RRC signaling, a media access control MAC control element, or physical layer signaling.

Therefore, a processing method of the terminal at the physical layer and/or the RRC layer may be notified by the base station by using a plurality of types of preset signaling.

In a possible implementation, after the processing, by the terminal, the at least one group of measurement samples for each cell to obtain at least one initial processing value, the method further includes: reporting, by the terminal, the at least one initial processing value to the base station or using, by the terminal itself, the at least one initial processing value to evaluate cell quality.

Therefore, the terminal may choose, based on an actual requirement or configuration of the base station, to report an existing processing result to the base station at a plurality of locations or use the existing processing result to evaluate cell quality.

In a possible implementation, after the processing, by the terminal, the at least one initial processing value to obtain at least one target processing value, the method further includes: reporting, by the terminal, the at least one target processing value to the base station or using, by the terminal itself, the at least one target processing value to evaluate cell quality.

Therefore, the terminal may choose, based on an actual requirement or configuration of the base station, to report an existing processing result to the base station at a plurality of locations or use the existing processing result to evaluate cell quality.

Optionally, the terminal may report an obtained result to the base station at each intermediate process point in processing processes at layer 1 and layer 3, or the terminal uses the obtained result to evaluate cell quality.

In a possible implementation, the processing, by the terminal, the at least one group of measurement samples for each cell to obtain at least one initial processing value includes: performing the following processing for at least one group of measurement samples for the ith cell: filtering, by the terminal, the at least one group of measurement samples for the ith cell according to a first filtering rule, to obtain Mi*Ni initial filtering values as initial processing values.

Therefore, the terminal may obtain the at least one initial processing value by using the first filtering rule for filtering.

Optionally, to reduce overheads and processing complexity, layer 1 may report only an initial processing value higher than a specific threshold to layer 3.

In a possible implementation, the processing, by the terminal, the at least one initial processing value to obtain at least one target processing value includes: performing the following processing for an initial processing value for the ith cell: filtering, by the terminal, the initial processing value for the ith cell according to a second filtering rule, to obtain at least one target filtering value; and calculating, by the terminal, a sum or an average value of the at least one target filtering value as a target processing value; or calculating, by the terminal, a sum or an average value of a target filtering value that is in the at least one target filtering value and that is greater than a preset target filtering value threshold, as a target processing value; or calculating, by the terminal, a sum or an average value of n target filtering values selected from the at least one target filtering value, as a target processing value, where the n selected target filtering values are not less than a target filtering value other than the n selected target filtering values in the at least one target filtering value, and n≥1; or calculating, by the terminal, a weighted sum of the at least one target filtering value as a target processing value based on a weight corresponding to the at least one target filtering value, where a weight of each target filtering value is configured by the base station or determined by the terminal.

Therefore, the terminal may obtain the target processing value based on the initial processing value by using a plurality of algorithms. Optionally, the weight may be configured by a serving cell based on cross-correlation information obtained from a neighboring cell, for example, based on a report of another terminal in this area, or based on configuration of a beam in the neighboring cell, or based on historical handover information of another terminal.

In a possible implementation, the processing, by the terminal, the at least one initial processing value to obtain at least one target processing value includes: performing the following processing for an initial processing value for the ith cell: filtering, by the terminal, the initial processing value for the ith cell according to a second filtering rule, to obtain at least one target filtering value, and determining a statistical value of a target filtering value for each transmit beam based on the at least one target filtering value to obtain statistical values of Mi target filtering values as target processing values; and/or determining a statistical value of a target filtering value for each receive beam based on the at least one target filtering value to obtain statistical values of Ni target filtering values as target processing values.

Therefore, the terminal may obtain a statistical value of each transmit beam and/or a statistical value of each receive beam based on the at least one target filtering value. Specifically, the statistical value may be obtained by using the following nonrestrictive four methods. An ith transmit beam is used as an example, and a sum or an average value of target filtering values corresponding to the ith transmit beam is used as a statistical value for the ith transmit beam. Alternatively, a target filtering value that is in target filtering values corresponding to the ith transmit beam and that is higher than a preset target filtering value threshold is selected, and a sum or an average value of the selected target filtering value is used as a statistical value for the ith transmit beam. Alternatively, n target filtering values are selected from target filtering values corresponding to the ith transmit beam, where the n target filtering values are not less than other target filtering value different from the n selected target filtering values in the target filtering values corresponding to the ith transmit beam, and a sum or an average value of the n target filtering values is used as a statistical value for the ith transmit beam. Alternatively, a weighted sum is calculated based on weights separately corresponding to target filtering values corresponding to the ith transmit beam, and is used as a statistical value for the ith transmit beam.

In a possible implementation, the processing, by the terminal, the at least one initial processing value to obtain at least one target processing value includes: performing the following processing for an initial processing value for the ith cell: filtering, by the terminal, the initial processing value for the ith cell according to a second filtering rule, to obtain at least one target filtering value; and performing the following processing based on the at least one target filtering value: determining a statistical value of a target filtering value for each transmit beam based on the at least one target filtering value to obtain statistical values of Mi target filtering values, and determining a target processing value based on the statistical values of the Mi target filtering values, where the target processing value is a sum, an average value, or a weighted sum of the statistical values of the Mi target filtering values, or a sum or an average value of a statistical value that is higher than a preset transmit threshold and that is in the statistical values of the Mi target filtering values, or a sum or an average value of statistical values of n target filtering values selected from the statistical values of the Mi target filtering values, where the statistical values of the n target filtering values selected from the statistical values of the Mi target filtering values are not less than a statistical value of a target filtering value other than the selected statistical values of the n target filtering values in the statistical values of the Mi target filtering values; and/or determining a statistical value of a target filtering value for each receive beam based on the at least one target filtering value to obtain statistical values of Ni target filtering values, and determining a target processing value based on the statistical values of the Ni target filtering values, where the target processing value is a sum, an average value, or a weighted sum of the statistical values of the Ni target filtering values, or a sum or an average value of a statistical value that is higher than a preset receive threshold and that is in the statistical values of the Ni target filtering values, or a sum or an average value of statistical values of n target filtering values selected from the statistical values of the Ni target filtering values, where the statistical values of the n target filtering values selected from the statistical values of the Ni target filtering values are not less than a statistical value of a target filtering value other than the selected statistical values of the n target filtering values in the statistical values of the Ni target filtering values.

Therefore, the terminal may obtain a relatively accurate target processing value by using a plurality of calculation processes at layer 3.

In a possible implementation, the processing, by the terminal, the at least one group of measurement samples for each cell to obtain at least one initial processing value includes: performing the following processing for at least one group of measurement samples for the ith cell: filtering, by the terminal, a plurality of groups of measurement samples for the ith cell according to a first filtering rule, to obtain Mi*Ni initial filtering values; and determining, by the terminal, a statistical value of an initial filtering value for each transmit beam based on the Mi*Ni initial filtering values to obtain statistical values of Mi initial filtering values as initial processing values, and/or determining, by the terminal, a statistical value of an initial filtering value for each receive beam based on the Mi*Ni initial filtering values to obtain statistical values of Ni initial filtering values as initial processing values.

Therefore, the terminal may obtain the initial processing value by using a plurality of methods.

In a possible implementation, the processing, by the terminal, the at least one initial processing value to obtain at least one target processing value includes: performing the following processing for initial processing values for the ith cell: when the terminal determines that the initial processing values for the ith cell are the statistical values of the Mi initial filtering values, performing filtering according to a second filtering rule to obtain Mi target filtering values, and determining a target processing value based on the Mi target filtering values, where the target processing value is a sum, an average value, or a weighted sum of the Mi target filtering values, or a sum or an average value of a statistical value that is higher than a preset transmit threshold and that is in the Mi target filtering values, or a sum or an average value of n target filtering values selected from the Mi target filtering values, where the n target filtering values selected from the Mi target filtering values are not less than a target filtering value other than the n selected target filtering values in the Mi target filtering values; or when the terminal determines that the initial processing values for the ith cell are the statistical values of the Ni initial filtering values, performing filtering according to a second filtering rule to obtain Ni target filtering values, and determining a target processing value based on the Ni target filtering values, where the target processing value is a sum, an average value, or a weighted sum of the Ni target filtering values, or a sum or an average value of a statistical value that is higher than a preset receive threshold and that is in the Ni target filtering values, or a sum or an average value of n target filtering values selected from the Ni target filtering values, where the n target filtering values selected from the Ni target filtering values are not less than a target filtering value other than the n selected target filtering values in the Ni target filtering values.

Therefore, the terminal may obtain the target filtering value by using a plurality of methods.

In a possible implementation, the processing, by the terminal, the at least one group of measurement samples for each cell to obtain at least one initial processing value includes: performing the following processing for at least one group of measurement samples for the ith cell: filtering, by the terminal, a plurality of groups of measurement results for the ith cell according to a first filtering rule, to obtain Mi*Ni initial filtering values; determining, by the terminal, a statistical value of an initial filtering value for each transmit beam based on the Mi*Ni initial filtering values to obtain statistical values of Mi initial filtering values, and determining an initial processing value based on the statistical values of the Mi initial filtering values, where the initial processing value is a sum, an average value, or a weighted sum of the statistical values of the Mi initial filtering values, or a sum or an average value of a statistical value that is higher than a preset transmit threshold and that is in the statistical values of the Mi initial filtering values, or a sum or an average value of statistical values of n initial filtering values selected from the statistical values of the Mi initial filtering values, where the statistical values of the n initial filtering values selected from the statistical values of the Mi initial filtering values are not less than a statistical value of an initial filtering value other than the selected statistical values of the n initial filtering values in the statistical values of the Mi initial filtering values; and/or determining, by the terminal, a statistical value of an initial filtering value for each receive beam based on the Mi*Ni initial filtering values to obtain statistical values of Ni initial filtering values, and determining an initial processing value based on the statistical values of the Ni initial filtering values, where the initial processing value is a sum, an average value, or a weighted sum of the statistical values of the Ni initial filtering values, or a sum or an average value of a statistical value that is higher than a preset receive threshold and that is in the statistical values of the Ni initial filtering values, or a sum or an average value of statistical values of n initial filtering values selected from the statistical values of the Ni initial filtering values, where the statistical values of the n initial filtering values selected from the statistical values of the Ni initial filtering values are not less than a statistical value of an initial filtering value other than the selected statistical values of the n initial filtering values in the statistical values of the Ni initial filtering values.

In a possible implementation, the processing, by the terminal, the at least one group of measurement samples for each cell to obtain at least one initial processing value includes: performing the following processing for at least one group of measurement samples for the ith cell: filtering, by the terminal, the at least one group of measurement samples for the ith cell according to a first filtering rule, to obtain Mi*Ni initial filtering values; and calculating, by the terminal, a sum or an average value of the Mi*Ni initial filtering values as an initial processing value; or calculating, by the terminal, a sum or an average value of an initial filtering value that is greater than a preset initial processing value threshold and that is in the Mi*Ni initial filtering values, as an initial processing value; or calculating, by the terminal, a sum or an average value of n initial filtering values selected from the Mi*Ni initial filtering values, as an initial processing value, where the n initial filtering values selected from the Mi*Ni initial filtering values are not less than an initial filtering value other than the n selected initial filtering values in the Mi*Ni initial filtering values; or calculating, by the terminal, a weighted sum of the Mi*Ni initial filtering values as an initial processing value based on weights separately corresponding to the Mi*Ni initial filtering values, where a weight of each initial filtering value is configured by the base station or determined by the terminal.

Therefore, the terminal may generate a cell-level initial processing value based on the initial filtering value, so as to improve accuracy of a final measurement result.

In a possible implementation, the processing, by the terminal, the at least one initial processing value to obtain at least one target processing value includes: filtering, by the terminal, the at least one initial processing value according to a second filtering rule, to obtain at least one target filtering value as a target processing value.

In a possible implementation, the second filtering rule is:

$$Fn = \text{Function}(Fn-1, Mn, Mn-1);$$

where Fn is a target filtering value obtained after current filtering, Fn−1 is a target filtering value obtained after previous filtering, Mn is an initial processing value reported current time at the physical layer, and Mn−1 is an initial processing value reported previous time at the physical layer.

Therefore, in this filtering rule, a problem that a channel environment changes quickly and a measurement jitter is obvious in a high-frequency network is considered, and a layer 3 filtering rule is optimized, so as to obtain a more accurate result.

According to a second aspect, a terminal is provided, including: a transceiver and a processor coupled to the transceiver; where the processor is configured to: receive, on a receive beam for each cell by using the transceiver, a reference signal sent on a transmit beam of a corresponding cell, and measure the received reference signal to obtain at least one group of measurement samples for each cell; process the at least one group of measurement samples for each cell to obtain at least one initial processing value; process the at least one initial processing value to obtain at least one target processing value; and report, by using the transceiver, a target processing value that meets a preset reporting rule in the at least one target processing value to a base station as a measurement result, or use the target processing value to evaluate cell quality.

In a possible implementation, if a quantity of cell transmit beams measured for an ith cell is Mi, and a quantity of receive beams for the ith cell is Ni, each group of measurement samples for the ith cell includes Mi*Ni measurement values, and both Mi and Ni are positive integers greater than or equal to 1.

In a possible implementation, processing the at least one group of measurement samples for each cell means processing the at least one group of measurement samples for each cell at a physical layer; and/or processing the at least one initial processing value means processing the at least one initial processing value at an RRC layer.

In a possible implementation, the method for obtaining the at least one initial processing value and/or the method for obtaining the at least one target processing value are/is notified by the base station to the terminal by using preset signaling, where the preset signaling is at least one of RRC signaling, a MAC control element, or physical layer signaling.

In a possible implementation, the processor is further configured to: after processing the at least one group of measurement samples for each cell to obtain the at least one initial processing value, report the at least one initial processing value to the base station or use the at least one initial processing value by the terminal itself to evaluate cell quality.

In a possible implementation, the processor is further configured to: after processing the at least one initial processing value to obtain the at least one target processing value, report the at least one target processing value to the base station or use the at least one target processing value by the terminal itself to evaluate cell quality.

In a possible implementation, the processor is specifically configured to: when processing the at least one group of measurement samples for each cell to obtain the at least one initial processing value, perform the following processing for at least one group of measurement samples for the ith cell: filtering the at least one group of measurement samples for the ith cell according to a first filtering rule, to obtain Mi*Ni initial filtering values as initial processing values.

In a possible implementation, the processor is specifically configured to: when processing the at least one initial processing value to obtain the at least one target processing value, perform the following processing for an initial processing value for the ith cell: filtering the initial processing value for the ith cell according to a second filtering rule, to obtain at least one target filtering value; and calculating a sum or an average value of the at least one target filtering value as a target processing value; or calculating a sum or an average value of a target filtering value that is in the at least one target filtering value and that is greater than a preset target filtering value threshold, as a target processing value; or calculating a sum or an average value of n target filtering values selected from the at least one target filtering value, as a target processing value, where the n selected target filtering values are not less than a target filtering value other than the n selected target filtering values in the at least one target filtering value, and n≥1; or calculating a weighted sum of the at least one target filtering value as a target processing value based on a weight corresponding to the at least one target filtering value, where a weight of each target filtering value is configured by the base station or determined by the terminal.

In a possible implementation, the processor is specifically configured to: when processing the at least one initial processing value to obtain the at least one target processing value, perform the following processing for an initial processing value for the ith cell: filtering the initial processing value for the ith cell according to a second filtering rule, to obtain at least one target filtering value, and determining a statistical value for each transmit beam based on the at least one target filtering value to obtain statistical values of Mi target filtering values as target processing values; and/or determining a statistical value for each receive beam based on the at least one target filtering value to obtain statistical values of Ni target filtering values as target processing values.

In a possible implementation, the processor is specifically configured to: when processing the at least one initial processing value to obtain the at least one target processing value, perform the following processing for an initial processing value for the ith cell: filtering the initial processing value for the ith cell according to a second filtering rule, to obtain at least one target filtering value; and perform the following processing based on the at least one target filtering value: determining a statistical value of a target filtering value for each transmit beam based on the at least one target filtering value to obtain statistical values of Mi target filtering values, and determining a target processing value based on the statistical values of the Mi target filtering values, where the target processing value is a sum, an average value, or a weighted sum of the statistical values of the Mi target filtering values, or a sum or an average value of a statistical value that is higher than a preset transmit threshold and that is in the statistical values of the Mi target filtering values, or a sum or an average value of statistical values of n target filtering values selected from the statistical values of the Mi target filtering values, where the statistical values of the n target filtering values selected from the statistical values of the Mi target filtering values are not less than a statistical value of a target filtering value other than the selected statistical values of the n target filtering values in the statistical values of the Mi target filtering values; and/or determining a statistical value of a target filtering value for each receive beam based on the at least one target filtering value to obtain statistical values of Ni target filtering values, and determining a target processing value based on the statistical values of the Ni target filtering values, where the target processing value is a sum, an average value, or a weighted sum of the statistical values of the Ni target filtering values, or a sum or an average value of a statistical value that is higher than a preset receive threshold and that is in the statistical values of the Ni target filtering values, or a sum or an average value of statistical values of n target filtering values selected from the statistical values of the Ni target filtering values, where the statistical values of the n target filtering values selected from the statistical values of the Ni target filtering values are not less than a statistical value of a target filtering value other than the selected statistical values of the n target filtering values in the statistical values of the Ni target filtering values.

In a possible implementation, the processor is specifically configured to: when processing the at least one group of measurement samples for each cell to obtain the at least one initial processing value, perform the following processing for at least one group of measurement samples for the ith cell: filtering a plurality of groups of measurement samples for the ith cell according to a first filtering rule, to obtain Mi*Ni initial filtering values; and determining a statistical value for each transmit beam based on the Mi*Ni initial filtering values to obtain statistical values of Mi initial filtering values as initial processing values, and/or determining a statistical value for each receive beam based on the Mi*Ni initial filtering values to obtain statistical values of Ni initial filtering values as initial processing values.

In a possible implementation, the processor is specifically configured to: when processing the at least one initial processing value to obtain the at least one target processing value, perform the following processing for initial processing values for the ith cell: when determining that the initial processing values for the ith cell are the statistical values of the Mi initial filtering values, performing filtering according to a second filtering rule to obtain Mi target filtering values, and determining a target processing value based on the Mi target filtering values, where the target processing value is a sum, an average value, or a weighted sum of the Mi target filtering values, or a sum or an average value of a statistical value that is higher than a preset transmit threshold and that is in the Mi target filtering values, or a sum or an average value of n target filtering values selected from the Mi target filtering values, where the n target filtering values selected from the Mi target filtering values are not less than a target filtering value other than the n selected target filtering values in the Mi target filtering values; or when determining that the initial processing values for the ith cell are the statistical values of the Ni initial filtering values, performing filtering according to a second filtering rule to obtain Ni target filtering values, and determining a target processing value based on the Ni target filtering values, where the target processing value is a sum, an average value, or a weighted sum of the Ni target filtering values, or a sum or an average value of a statistical value that is higher than a preset receive threshold and that is in the Ni target filtering values, or a sum or an average value of n target filtering values selected from the Ni target filtering values, where the n target filtering values selected from the Ni target filtering values are not less than a target filtering value other than the n selected target filtering values in the Ni target filtering values.

In a possible implementation, the processor is specifically configured to: when processing the at least one group of measurement samples for each cell to obtain the at least one initial processing value, perform the following processing for at least one group of measurement samples for the ith cell: filtering a plurality of groups of measurement samples for the ith cell according to a first filtering rule, to obtain Mi*Ni initial filtering values; and determining a statistical value of an initial filtering value for each transmit beam based on the Mi*Ni initial filtering values to obtain statistical values of Mi initial filtering values, and determining an initial processing value based on the statistical values of the Mi initial filtering values, where the initial processing value is a sum, an average value, or a weighted sum of the statistical values of the Mi initial filtering values, or a sum or an average value of a statistical value that is higher than a preset transmit threshold and that is in the statistical values of the Mi initial filtering values, or a sum or an average value of statistical values of n initial filtering values selected from the statistical values of the Mi initial filtering values, where the statistical values of the n initial filtering values selected from the statistical values of the Mi initial filtering values are not less than a statistical value of an initial filtering value other than the selected statistical values of the n initial filtering values in the statistical values of the Mi initial filtering values; and/or determining a statistical value of an initial filtering value for each receive beam based on the Mi*Ni initial filtering values to obtain statistical values of Ni initial filtering values, and determining an initial processing value based on the statistical values of the Ni initial filtering values, where the initial processing value is a sum, an average value, or a weighted sum of the statistical values of the Ni initial filtering values, or a sum or an average value of a statistical value that is higher than a preset receive threshold and that is in the statistical values of the Ni initial filtering values, or a sum or an average value of statistical values of n initial filtering values selected from the statistical values of the Ni initial filtering values, where the statistical values of the n initial filtering values selected from the statistical values of the Ni initial filtering values are not less than a statistical value of an initial filtering value other than the selected statistical values of the n initial filtering values in the statistical values of the Ni initial filtering values.

In a possible implementation, the processor is specifically configured to: when processing the at least one group of measurement samples for each cell to obtain the at least one initial processing value, perform the following processing for at least one group of measurement samples for the ith cell: filtering the at least one group of measurement samples for the ith cell according to a first filtering rule, to obtain Mi*Ni initial filtering values; and calculating a sum or an average value of the Mi*Ni initial filtering values as an initial processing value; or calculating a sum or an average value of an initial filtering value that is greater than a preset initial processing value threshold and that is in the Mi*Ni initial filtering values, as an initial processing value; or calculating a sum or an average value of n initial filtering values selected from the Mi*Ni initial filtering values, as an initial processing value, where the n initial filtering values selected from the Mi*Ni initial filtering values are not less than an initial filtering value other than the n selected initial filtering values in the Mi*Ni initial filtering values; or calculating a weighted sum of the Mi*Ni initial filtering values as an initial processing value based on weights separately corresponding to the Mi*Ni initial filtering values, where a weight of each initial filtering value is configured by the base station or determined by the terminal.

In a possible implementation, the processor is specifically configured to: when processing the at least one initial processing value to obtain the at least one target processing value, filter the at least one initial processing value according to a second filtering rule, to obtain at least one target filtering value as a target processing value.

In a possible implementation, the second filtering rule is:

$Fn=\text{Function}(Fn-1, Mn, Mn-1);$ where Fn is a target filtering value obtained after current filtering, Fn−1 is a target filtering value obtained after previous filtering, Mn is an initial processing value reported current time at the physical layer, and Mn−1 is an initial processing value reported previous time at the physical layer.

According to a third aspect, an embodiment of the present invention provides an apparatus for generating a measurement result, where the scheduling apparatus is applied to a terminal and includes a transceiver unit and a processing unit. The processing unit is configured to: receive, on a receive beam for each cell by using the sending unit, a reference signal sent on a transmit beam of a corresponding cell, and measure the received reference signal to obtain at least one group of measurement samples for each cell; process the at least one group of measurement samples for each cell to obtain at least one initial processing value; process the at least one initial processing value to obtain at least one target processing value; and report, by using the transceiver unit, a target processing value that meets a preset reporting rule in the at least one target processing value to a base station as a measurement result, or use the target processing value by the terminal itself to evaluate cell quality.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the prior art, an RRM measurement result is mainly a measurement result of reference signal quality. In this case, a reference signal may be a cell-specific reference signal (Cell-specific Reference Signal, CRS) or another reference signal, for example, a channel state information reference signal (Channel State Information Reference Signal, CSI-RS). An RRM measurement result of a terminal may be used for various operations, including cell addition/deletion and handover, and the like.

It can be learned from the foregoing background that, in a high-frequency network, because of, for example, lower diffraction, a higher outdoor/indoor penetration loss, and atmospheric/rain attenuation and a higher body loss, signal coverage becomes more vulnerable. Therefore, a beamforming technology is widely used. An area of one cell may be covered by a plurality of narrow high-gain beams. A reference signal in the high-frequency network may also change, and is no longer a reference signal in an LTE system. For example, a new specific reference signal may be used instead of a CRS in LTE for RRM measurement. Such a reference signal may be sent by using a directional beam, so as to overcome attenuation of a wireless signal.

Therefore, each terminal that is covered by a narrow beam may receive a reference signal, and the terminal reports a measurement result of the reference signal to a base station, where the measurement result may be used to perform a mobility operation such as cell addition, cell deletion, and a cell handover.

In the high-frequency network, to increase a capacity and enhance coverage, a new air interface will rely on frequent use of beamforming. Therefore, a reference signal used for RRM measurement may be beamformed and sent by using a beam through sweeping. Therefore, beam-based RRM measurement is an important issue studied in the high-frequency network.

Figure 1:
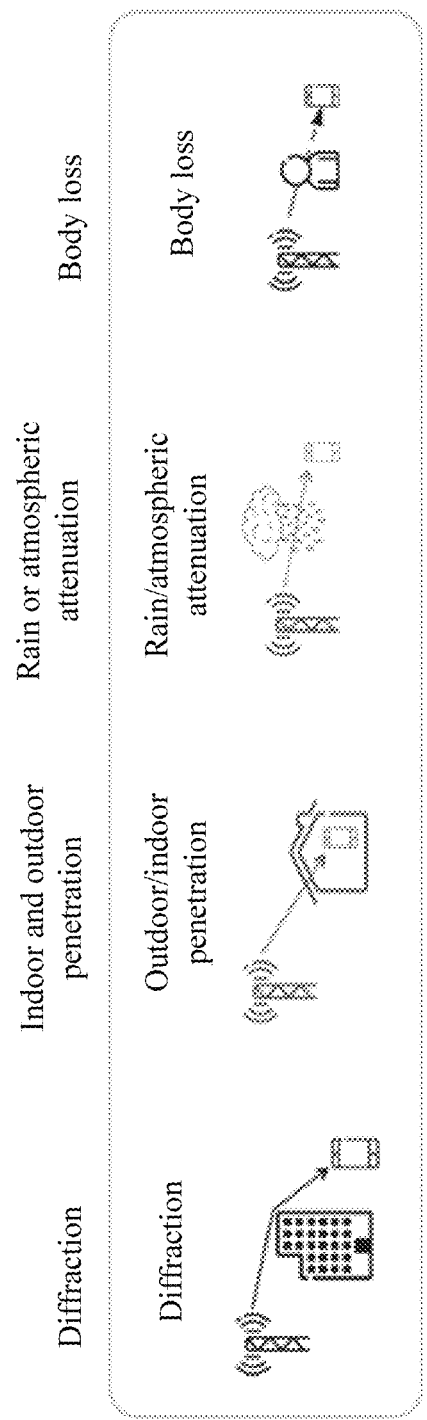
FIG. 1 is a schematic diagram of signal coverage attenuation in a high-frequency network scenario in the background of the present invention.
Figure 2A:
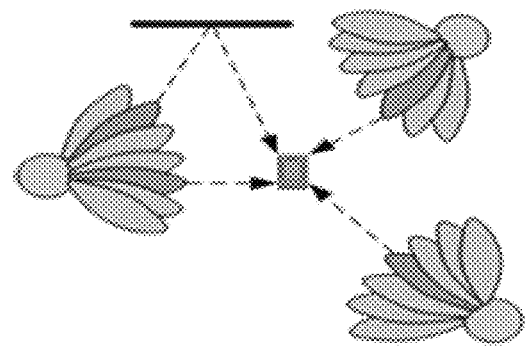
FIG. 2(a) is a first schematic diagram of an application scenario in which a cell in a high-frequency network is covered by a plurality of narrow beams in the background of the present invention.
Figure 2B:
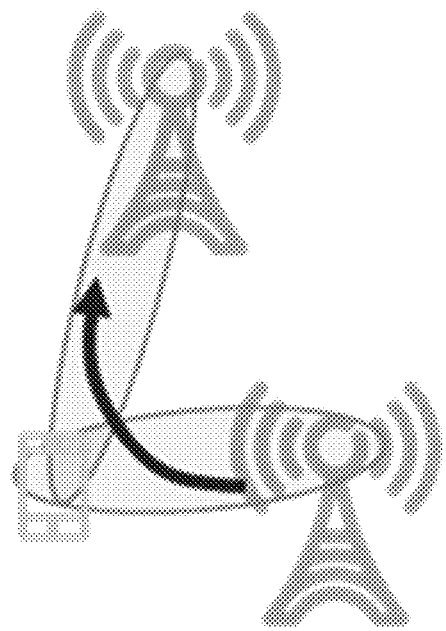
FIG. 2(b) is a second schematic diagram of an application scenario in which a cell in a high-frequency network is covered by a plurality of narrow beams in the background of the present invention.
Figure 3:
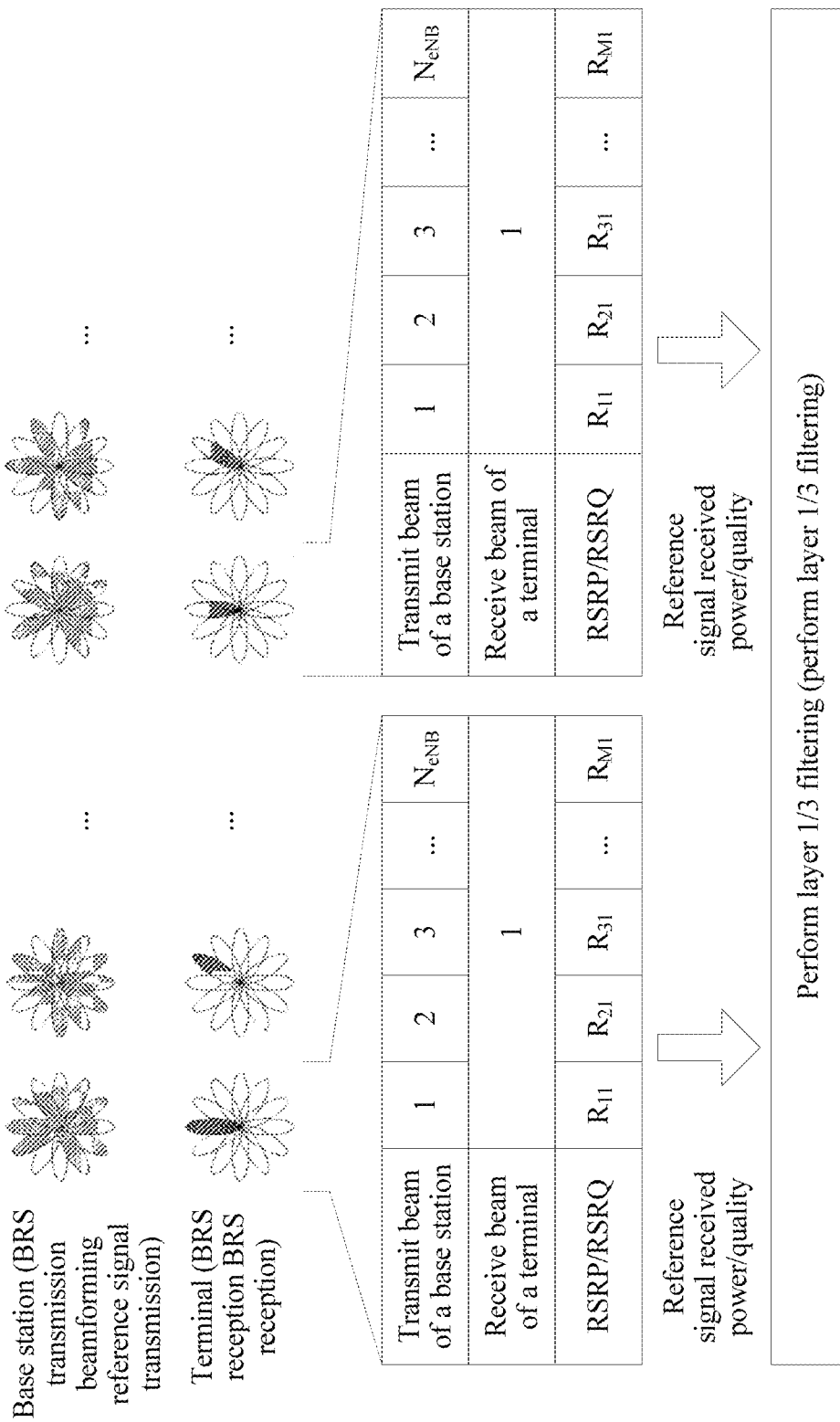
FIG. 3 is a schematic diagram in which a base station sends a reference signal and a terminal receives the reference signal according to an embodiment of the present invention.

FIG. 3 is a schematic diagram in which a base station sends a reference signal and a terminal receives the reference signal. The base station may send the reference signal in each transmit beam direction, and the terminal measures received reference signal quality on one receive beam within a period of time. In FIG. 3, the terminal receives, on a receive beam 1, reference signals sent by the base station on transmit beams 1 to N, and the terminal separately obtains measurement results R11, R21, . . . , and RN1 for combinations of each transmit beam and the receive beam 1.

Figure 4:
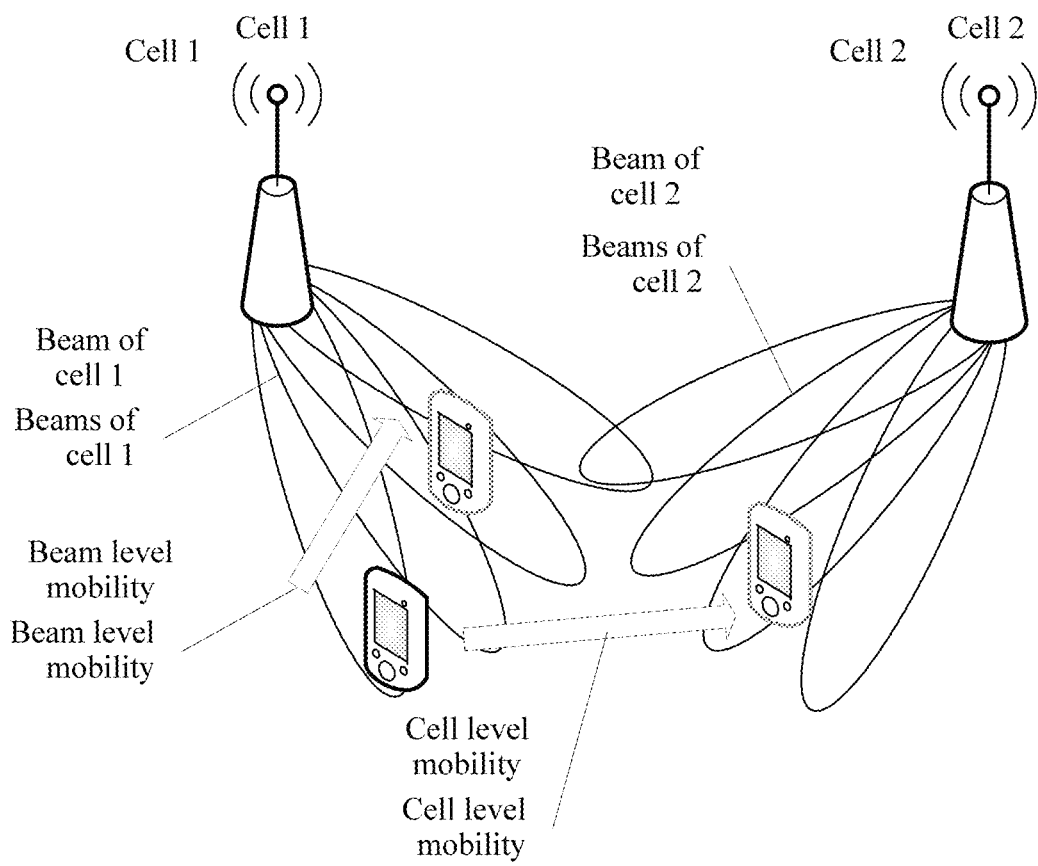
FIG. 4 is a schematic diagram of an application scenario of multi-beam coverage according to an embodiment of the present invention.

An application scenario of this embodiment of the present invention is shown in FIG. 4. To improve stable coverage in a cell, beam rotation modes are overlapped in a spatial domain. The beam rotation mode not only radiates a main lobe direction (an array gain is the strongest), but also radiates another direction, so that side lobe and back lobe directions also have a relatively large array gain. Therefore, the terminal may detect reference signals sent on a plurality of transmit beams for each cell.

In FIG. 4, in beam level mobility (Beam level mobility), a terminal may move within a serving cell, and move from a coverage area of one beam to a coverage area of another beam. The beam level mobility may be considered as beam management rather than cell level mobility management, because beams used for communication by the terminal may change over time within coverage of a same (serving) cell, and this is very dynamic. In cell level mobility, that the terminal moves from a coverage area of one cell to a coverage area of another cell means that a serving cell serving the terminal changes. RRM measurement is mainly used for the cell level mobility.

Figure 5:
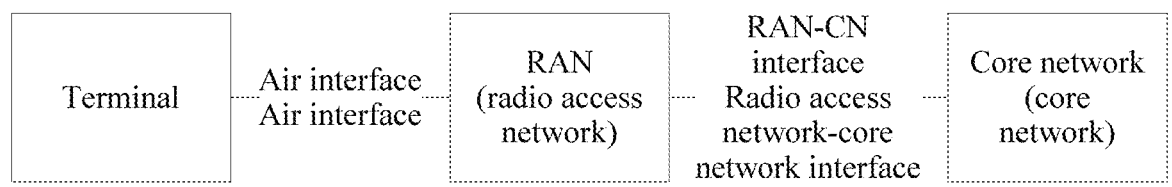
FIG. 5 is a schematic diagram of network element connection according to an embodiment of the present invention.

Referring to FIG. 5, network elements in this embodiment of the present invention include a terminal such as UE or a 5G terminal; a radio access network such as a macro base station or a micro base station in an LTE system or a 5G base station; and a core network.

Figure 6:
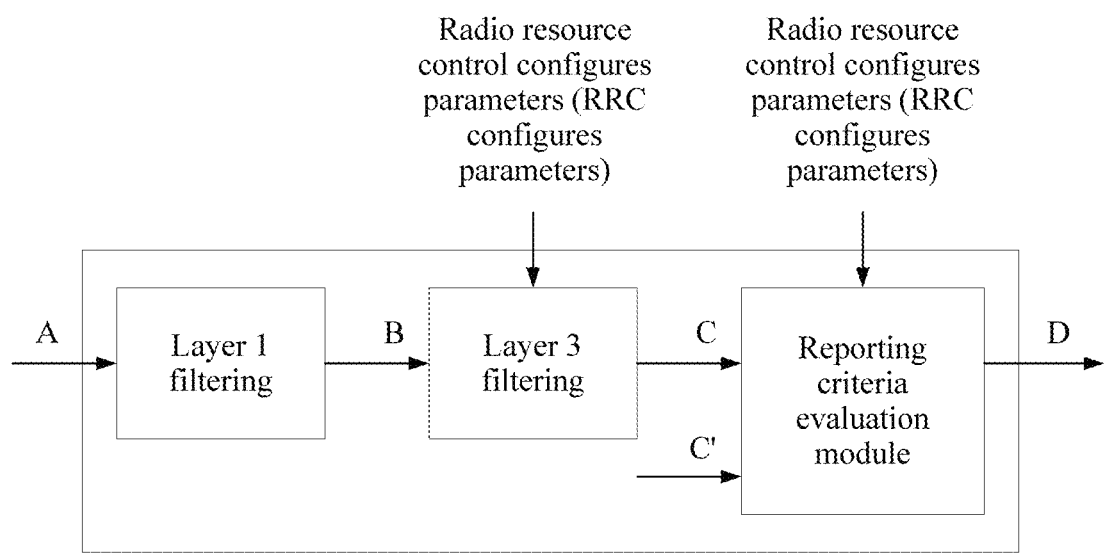
FIG. 6 is a schematic diagram of an existing LTE measurement model according to an embodiment of the present invention.

An existing measurement model in LTE is shown in FIG. 6 (TS36.300 section 10.6). Layer 1 herein is a physical layer, and layer 3 is a radio resource control (Radio Resource Control, RRC) layer.

A: A measurement sample is input to the physical layer.

Layer 1 filtering (layer 1 filtering): Layer 1 filtering is performed on the input measured at point A. A specific level of measurement averaging is introduced in layer 1 filtering. An exact filtering method depends on an implementation of each manufacturer. How measurement is actually performed at the physical layer by an implementation (that is, the input at point A and layer 1 filtering) is not included in the standard. However, input at point B needs to meet performance requirements specified in TS36.133.

B: Measurement is reported by layer 1 to layer 3 after layer 1 filtering.

Layer 3 filtering (layer 3 filtering): Filtering is performed on the measurement provided at point B. Behavior of layer 3 filtering is standardized and a configuration rule of layer 3 filtering is provided by RRC signaling. A filtering reporting period at point C equals a measurement period at point B.

C: Measurement after layer 3 filtering processing is used as input for one or more reporting criteria evaluation modules.

Evaluation of reporting criteria (reporting criteria evaluation module): This checks whether actual measurement reporting, namely, reporting a measurement report, is necessary at point D. The evaluation may be based on more than one flow of measurement at point C, for example, to compare between different measurement. The input herein is illustrated by C and C'. The reporting criteria are standardized and a configuration rule of the reporting criteria is provided by RRC signaling.

D: Measurement report information is sent over a radio interface.

In addition, layer 3 filtering and parameters are specified in TS36.331 section 5.5.3.2. A formula used for layer 3 filtering is as follows:

$$F_n = (1-a) \cdot F_{n-1} + a \cdot M_n$$

Mn is a latest received measurement result from layer 1. Fn is a filtered measurement result. Fn−1 is a previous filtered measurement result, where Fo is set to Mi when the first measurement result from layer 1 is received. $a = 1/2^{(k/4)}$, where k is a filter coefficient (filterCoefficient) for a corresponding measurement quantity received by quantity configuration (quantityConfig). The filterCoefficient k assumes a sample rate equal to 200 milliseconds.

To enable a terminal to measure a reference signal that is received on a receive beam n and that is sent on a transmit beam m, and obtain Rmn, a base station needs to indicate, to the terminal, transmit beam modes of a serving cell and a neighboring cell. A measurement result statistical value for one receive beam n may be represented as Rn. A measurement result statistical value for a transmit beam may be represented as Rm. A cell-level measurement result may be represented as R. In addition, Rmn, Rn, and Rm may be used not only for cell level mobility management, but also for beam level mobility management at a media access control (Media Access Control, MAC) layer and a physical layer. Therefore, generation and reporting of a measurement result of the terminal and modification of a measurement model depend on whether the network or the terminal expects a cell-level measurement result or a beam-level measurement result.

Figure 7:
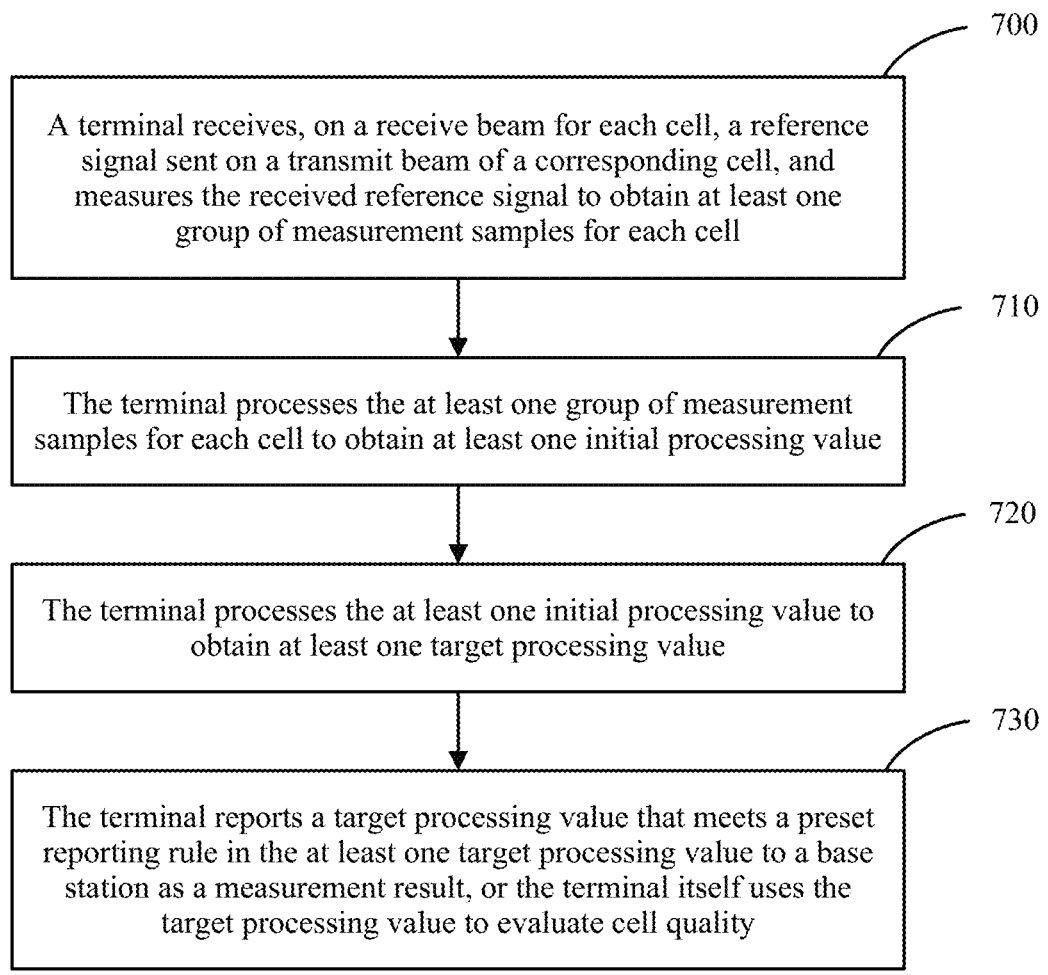
FIG. 7 is an overview flowchart of generating a measurement result according to an embodiment of the present invention.

Referring to FIG. 7, an embodiment of the present invention provides a method for generating a measurement result, including the following steps:

Step 700: A terminal receives, on a receive beam for each cell, a reference signal sent on a transmit beam of a corresponding cell, and measures the received reference signal to obtain at least one group of measurement samples for each cell.

If a quantity of cell transmit beams measured by the terminal for an ith cell is Mi, and a quantity of receive beams of the terminal for the ith cell is Ni, each group of measurement samples for the ith cell includes Mi*Ni measurement values, and both Mi and Ni are positive integers greater than or equal to 1.

The plurality of cells herein may include a serving cell and a neighboring cell, transmit beams of the cells may be different, and corresponding receive beams of the terminal for the cells may also be different. A base station needs to indicate, to the terminal, transmit beam modes of the serving cell and the neighboring cell, so that the terminal learns of a transmit beam of each cell and a corresponding receive beam.

Step 710: The terminal processes the at least one group of measurement samples for each cell to obtain at least one initial processing value.

Step 720: The terminal processes the at least one initial processing value to obtain at least one target processing value.

Step 730: The terminal reports a target processing value that meets a preset reporting rule in the at least one target processing value to a base station as a measurement result, or the terminal itself uses the target processing value to evaluate cell quality.

For step 710 and step 720, that the terminal processes the at least one group of measurement samples for each cell means that the terminal processes the at least one group of measurement samples for each cell at a physical layer; and/or that the terminal processes the at least one initial processing value means that the terminal processes the at least one initial processing value at an RRC layer.

A method for obtaining the at least one initial processing value by the terminal and/or a method for obtaining the at least one target processing value by the terminal are/is notified by the base station to the terminal by using preset signaling, where the preset signaling is at least one of RRC signaling, a MAC control element, or physical layer signaling.

For step 730, after processing the at least one group of measurement samples for each cell to obtain the at least one initial processing value, the terminal reports the at least one initial processing value to the base station or the terminal itself uses the at least one initial processing value to evaluate cell quality; and/or after processing the at least one initial processing value to obtain the at least one target processing value, the terminal reports the at least one target processing value to the base station or the terminal itself uses the at least one target processing value to evaluate cell quality.

Optionally, the terminal may report an obtained result to the base station at each intermediate process point in processing processes at layer 1 and layer 3, or the terminal uses the obtained result to evaluate cell quality.

Therefore, the terminal may choose, based on an actual requirement or configuration of the base station, to report an existing processing result to the base station at a plurality of locations or use the existing processing result to evaluate cell quality.

In the following, the preferred implementations of the present invention are described in detail with reference to the accompanying drawings.

First Measurement Model:

An ith cell is used as an example, and when processing the at least one group of measurement samples for each cell to obtain the at least one initial processing value, the terminal performs the following processing for at least one group of measurement samples for the ith cell:

The terminal filters the at least one group of measurement samples for the ith cell according to a first filtering rule, to obtain Mi*Ni initial filtering values as initial processing values.

The ith cell is still used as an example, and when processing the at least one initial processing value to obtain the at least one target processing value, the terminal performs the following processing for an initial processing value for the ith cell:

The terminal filters the at least one initial processing value according to a second filtering rule, to obtain at least one target filtering value as a target processing value.

Figure 8:
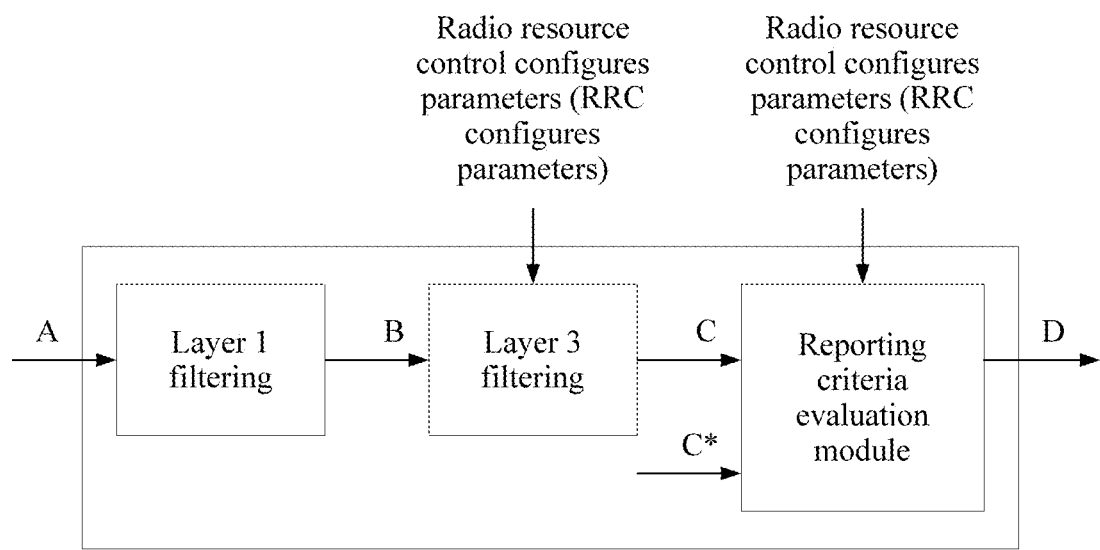
FIG. 8 is a schematic diagram of a first measurement model according to an embodiment of the present invention.

Specifically, referring to FIG. 8, at point A, the terminal obtains the at least one group of measurement samples for the ith cell, where each group of measurement samples includes Mi*Ni measurement values.

For example, it is assumed that Ni receive beams include a receive beam 1 and a receive beam 2, and measured Mi transmit beams include a transmit beam 1, a transmit beam 2, and a transmit beam 3. The terminal receives, on the receive beam 1, reference signals sent by the base station on the transmit beams 1 to 3, the terminal obtains R11, R21, and R31 for combinations of each transmit beam and the receive beam 1, and the terminal obtains R12, R22, and R32 for combinations of each transmit beam and the receive beam 2. Therefore, each group of measurement samples includes six measurement values.

Layer 1 filtering is performed according to the first filtering rule, to obtain Mi*Ni initial filtering values as initial processing values.

For example, the foregoing example is still used for description. It is assumed that the terminal obtains 10 groups of measurement samples for the ith cell, and each group of measurement samples includes six measurement values. Then, filtering is performed on a same combination of a receive beam and a transmit beam, for example, filtering is performed on 10 pieces of R11, for example, averaging is performed. A specific filtering rule may vary with a design of each manufacturer.

At point B, layer 1 reports the initial processing values processed by layer 1 to layer 3. Optionally, to reduce overheads and processing complexity, layer 1 may report only an initial processing value higher than a specific threshold to layer 3.

Layer 3 filtering is performed according to the second filtering rule. For example, six initial processing values are obtained by using the foregoing example, and a filtering formula $F_n=(1-a)\cdot F_{n-1}+a\cdot M_n$ provided in the prior art may be used herein.

Optionally, this embodiment of the present invention provides a new filtering algorithm:

$$Fn=\text{Function}(Fn-1, Mn, Mn-1);$$

where Fn is a target filtering value obtained after current filtering, Fn−1 is a target filtering value obtained after previous filtering, Mn is an initial processing value reported current time at the physical layer, and Mn−1 is an initial processing value reported previous time at the physical layer. The function herein is a real function.

In addition, in an LTE system, a measurement reporting rate from layer 1 to layer 3 is that one value is reported every 200 milliseconds. In a high-frequency network, because different beam combinations need to be measured at layer 1, a measurement sampling rate may be significantly different from that in an existing LTE. Therefore, the measurement reporting rate from layer 1 to layer 3 may also be significantly different.

Specifically, for different frequency scenarios, because the base station may learn of a beam combination measured by the terminal, the base station may configure a plurality of reporting rates for the terminal. Alternatively, the terminal may predefine a plurality of reporting rates, determine a current frequency scenario based on measurement evaluation, and further use a corresponding reporting rate.

At point C, a target filtering value obtained after layer 3 filtering is reported to a reporting criteria evaluation module as a target processing value. For example, in the foregoing example, six initial processing values are obtained after layer 1 processing, six target processing values are also obtained after layer 3 processing, and the six target processing values are reported to the reporting criteria evaluation module. The reporting criteria evaluation module includes a plurality of preset reporting rules configured by the base station.

C and C* may be represented as that layer 3 separately reports the target processing values for two cells.

A measurement result reported by the terminal at point D is a target processing value that meets a preset reporting rule in the target processing value.

In addition, the terminal may alternatively not report, to the base station, the target processing value that meets the preset reporting rule, and use any obtained result at points B to D to evaluate cell quality or report the result to the base station.

Second Measurement Model:

An ith cell is used as an example, and when processing the at least one group of measurement samples for each cell to obtain the at least one initial processing value, the terminal performs the following processing for at least one group of measurement samples for the ith cell:

The terminal filters the at least one group of measurement samples for the ith cell according to a first filtering rule, to obtain $Mi*Ni$ initial filtering values as initial processing values.

The ith cell is still used as an example, and when processing the at least one initial processing value to obtain the at least one target processing value, the terminal performs the following processing for an initial processing value for the ith cell:

The terminal filters the initial processing value for the ith cell according to a second filtering rule, to obtain at least one target filtering value; and the terminal calculates a sum or an average value of the at least one target filtering value as a target processing value; or the terminal calculates a sum or an average value of a target filtering value that is in the at least one target filtering value and that is greater than a preset target filtering value threshold, as a target processing value; or the terminal calculates a sum or an average value of n target filtering values selected from the at least one target filtering value, as a target processing value, where the n selected target filtering values are not less than a target filtering value other than the n selected target filtering values in the at least one target filtering value, and n≥1; or the terminal calculates a weighted sum of the at least one target filtering value as a target processing value based on a weight corresponding to the at least one target filtering value, where a weight of each target filtering value is configured by the base station or determined by the terminal.

Figure 9:
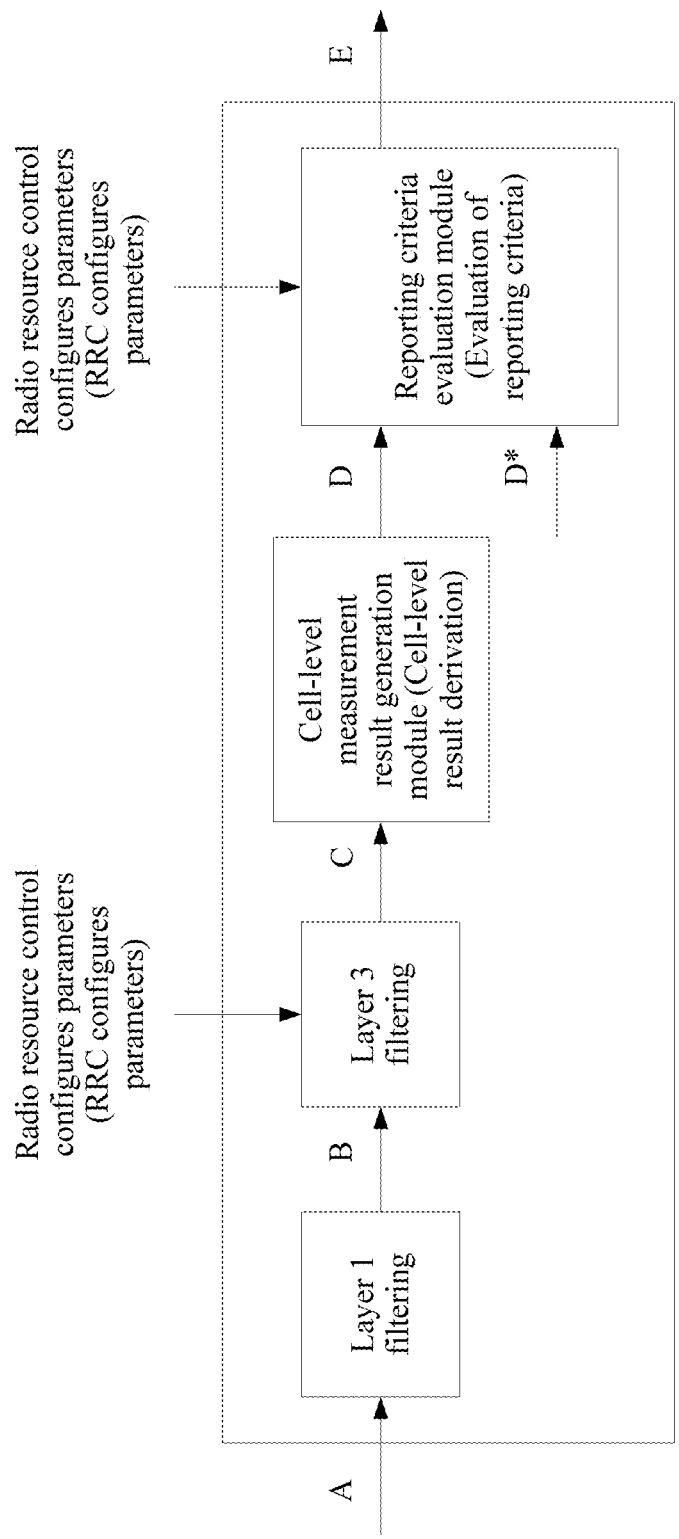
FIG. 9 is a schematic diagram of a second measurement model according to an embodiment of the present invention.

Specifically, referring to FIG. 9, at point A, the terminal obtains the at least one group of measurement samples for the ith cell, where each group of measurement samples includes $Mi*Ni$ measurement values.

Layer 1 filtering is performed according to the first filtering rule, to obtain $Mi*Ni$ initial filtering values as initial processing values.

At point B, layer 1 reports the initial processing values processed by layer 1 to layer 3. Optionally, to reduce overheads and processing complexity, layer 1 may report only an initial processing value higher than a specific threshold to layer 3.

Layer 3 filtering is performed. A filtering method used herein is the same as the filtering method in the first measurement model, and repeated content is not described again.

Further, at least one target filtering value is obtained after layer 3 filtering, and is input to a cell-level measurement result generation module.

In the cell-level measurement result generation module, a target processing value may be obtained by using the following nonrestrictive four methods. Target filtering values R11, R21, R31, R12, R22, and R32 obtained after layer 3 filtering are used as an example for description.

(Method 1) A sum or an average value of the target filtering values is used as the target processing value:

$$R=R11+R21+R31+R12+R22+R32; \text{ or}$$

$$R=(R11+R21+R31+R12+R22+R32)/6$$

(Method 2) First, target filtering values that are higher than a preset target filtering value threshold are selected from the six values. It is assumed that the selected target filtering values are R11, R31, R12, and R32, and a sum or an average value of the target filtering values that are in the target filtering values and that are greater than the preset target filtering value threshold is used as the target processing value:

$$R=R11+R31+R12+R32; \text{ or}$$

$$R=(R11+R31+R12+R32)/4$$

(Method 3) First, one or more highest target filtering values are selected from a descending order of the six values. It is assumed that three highest target filtering values R11, R31, R12 are selected, R11>R31>R12, and a sum or an average value of the three target filtering values is used as the target processing value:

$$R=R11+R31+R12;$$

$$R=(R11+R31+R12)/3$$

Herein, the three highest target filtering values may be alternatively determined in another manner, and this is not limited herein.

(Method 4) Based on weights separately corresponding to the target filtering values, a weighted sum of the target filtering values is calculated as the target processing value:

$$R=a1R11+a2R21+a3R31+a4R12+a5R22+a6R32$$

Optionally, weights a1 to a6 are configured by a serving cell based on cross-correlation information obtained from a neighboring cell, for example, based on a report of another terminal in this area, or based on configuration of a beam in the neighboring cell, or based on historical handover information of another terminal.

At point D, the target processing value obtained by the cell-level measurement result generation module is reported to a reporting criteria evaluation module, and a measurement result reported by the terminal at point E is a target processing value that meets a preset reporting rule in the target processing value.

Similarly, D and D* may be represented as that layer 3 separately reports the target processing values for two cells.

In addition, the terminal may alternatively not report, to the base station, the target processing value that meets the preset reporting rule, and use any obtained result at points B to E to evaluate cell quality or report the result to the base station.

Third Measurement Model:

An ith cell is used as an example, and when processing the at least one group of measurement samples for each cell to obtain the at least one initial processing value, the terminal performs the following processing for at least one group of measurement samples for the ith cell:

The terminal filters the at least one group of measurement samples for the ith cell according to a first filtering rule, to obtain $Mi*Ni$ initial filtering values as initial processing values.

The ith cell is still used as an example, and when processing the at least one initial processing value to obtain the at least one target processing value, the terminal performs the following processing for an initial processing value for the ith cell:

The terminal filters the initial processing value for the ith cell according to a second filtering rule, to obtain at least one target filtering value, and determines a statistical value of a target filtering value for each transmit beam based on the at least one target filtering value to obtain statistical values of Mi target filtering values as target processing values; and/or determines a statistical value of a target filtering value for each receive beam based on the at least one target filtering value to obtain statistical values of Ni target filtering values as target processing values.

Figure 10:
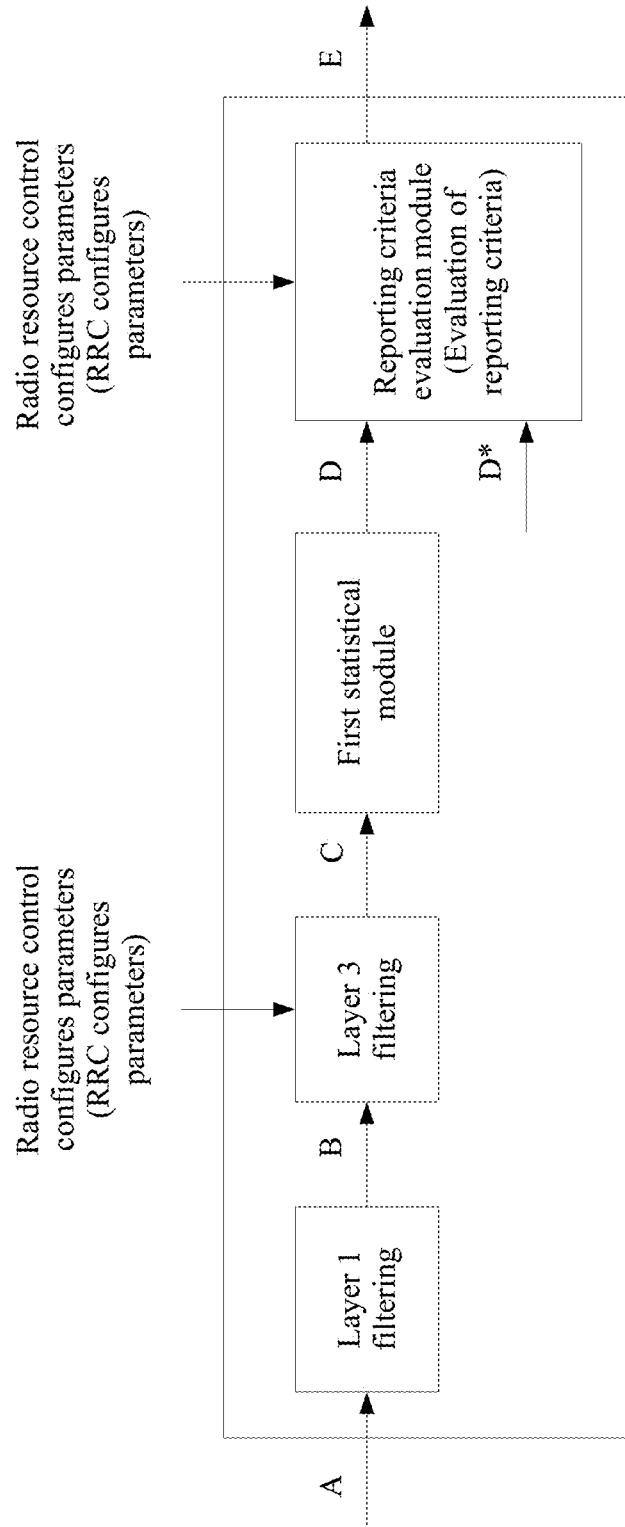
FIG. 10 is a schematic diagram of a third measurement model according to an embodiment of the present invention.

Specifically, referring to FIG. 10, at point A, the terminal obtains the at least one group of measurement samples for the ith cell, where each group of measurement samples includes $Mi*Ni$ measurement values.

Layer 1 filtering is performed according to the first filtering rule, to obtain $Mi*Ni$ initial filtering values as initial processing values.

At point B, layer 1 reports the initial processing values processed by layer 1 to layer 3. Optionally, to reduce overheads and processing complexity, layer 1 may report only an initial processing value higher than a specific threshold to layer 3.

Layer 3 filtering is performed. A filtering method used herein is the same as the filtering method in the first measurement model, and repeated content is not described again.

Further, at least one target filtering value is obtained after layer 3 filtering, and is input into a first statistical module at point C.

In the first statistical module, a statistical value for each transmit beam and/or a statistical value for each receive beam are/is generated as the target processing value. The statistical value for each transmit beam and/or the statistical value for each receive beam may be obtained by using the following nonrestrictive four methods. Target filtering values R11, R21, R31, R12, R22, and R32 obtained after layer 3 filtering are still used as an example for description.

(1)

Transmit beam 1: $R1=R11+R12$, or $R1=(R11+R12)/2$;

transmit beam 2: $R2=R21+R22$, or $R2=(R21+R22)/2$;

transmit beam 3: $R3=R31+R32$, or $R3=(R31+R32)/2$; and/or receive beam 1: $R1=R11+R21+R31$, or $R1=(R11+R21+R31)/3$;

receive beam 2: $R2=R12+R22+R32$, or $R2=(R12+R22+R32)/3$

It should be understood that, to make a measurement result better reflect a data transmission effect, it is expected that transmit beams have very different directions, or receive beams have very different directions.

(2) First, target processing values that are higher than a preset target filtering value threshold are selected from the six values, and it is assumed that the selected target filtering values are R11, R31, R12, and R32, then:

transmit beam 1: $R11=R11+R12$, or $R1=(R11+R12)/2$;

transmit beam 2: $R2=0$;

transmit beam 3: $R3=R31+R32$, or $R3=(R31+R32)/2$; and/or receive beam 1: $R1=R11+R31$, or $R1=(R11+R31)/2$;

receive beam 2: $R2=R12+R32$, or $R2=(R12+R32)/2$ (3) A statistical value for each transmit beam and/or a statistical value for each receive beam are/is calculated based on weights separately corresponding to the target filtering values.

Transmit beam 1: $R1=a1R11+a4R12$;

transmit beam 2: $R2=a2R21+a5R22$;

transmit beam 3: $R3=a3R31+a6R32$; and/or receive beam 1: $R1=a1R11+a2R21+a3R31$;

receive beam 2: $R2=a4R12+a5R22+a6R32$;

$R=a1R11+a2R21+a3R31+a4R12+a5R22+a6R32$

Optionally, weights a1 to a6 are configured by a serving cell based on cross-correlation information obtained from a neighboring cell, for example, based on a report of another terminal in this area, or based on configuration of a beam in the neighboring cell, or based on historical handover information of another terminal.

(4) A sum or an average value of n target filtering values selected from target filtering values collected for each transmit beam is used as a statistical value corresponding to the transmit beam, and the n target filtering value selected from the target filtering values collected for each transmit beam are not less than a target filtering value other than the n selected target filtering values in the target filtering values collected for each transmit beam; and/or a sum or an average value of n target filtering values selected from target filtering values collected for each receive beam is used as a statistical value corresponding to the receive beam, and the n target filtering value selected from the target filtering values collected for each receive beam are not less than a target filtering value other than the n selected target filtering values in the target filtering values collected for each receive beam.

For example, target filtering values for the transmit beam 1 are R11 and R12. To select one target filtering value, a maximum value of the target filtering values is used as a target filtering value of the transmit beam 1, the maximum value is R11, and $R1=R11$.

At point D, the target processing value obtained by the first statistical module is reported to a reporting criteria evaluation module, and a measurement result reported by the terminal at point E is a target processing value that meets a preset reporting rule in the target processing value.

Similarly, D and D* may be represented as that layer 3 separately reports the target processing values for two cells.

In addition, the terminal may alternatively not report, to the base station, the target processing value that meets the preset reporting rule, and use any obtained result at points B to E to evaluate cell quality or report the result to the base station.

Fourth Measurement Model:

An ith cell is used as an example, and when processing the at least one group of measurement samples for each cell to obtain the at least one initial processing value, the terminal performs the following processing for at least one group of measurement samples for the ith cell:

The terminal filters the at least one group of measurement samples for the ith cell according to a first filtering rule, to obtain Mi*Ni initial filtering values as initial processing values.

The ith cell is still used as an example, and when processing the at least one initial processing value to obtain the at least one target processing value, the terminal performs the following processing for an initial processing value for the ith cell:

The terminal filters the initial processing value for the ith cell according to a second filtering rule to obtain at least one target filtering value, and performs the following processing based on the at least one target filtering value: determining a statistical value of a target filtering value for each transmit beam based on the at least one target filtering value to obtain statistical values of Mi target filtering values, and determining a target processing value based on the statistical values of the Mi target filtering values, where the target processing value is a sum, an average value, or a weighted sum of the statistical values of the Mi target filtering values, or a sum or an average value of a statistical value that is higher than a preset transmit threshold and that is in the statistical values of the Mi target filtering values, or a sum or an average value of statistical values of n target filtering values selected from the statistical values of the Mi target filtering values, where the statistical values of the n target filtering values selected from the statistical values of the Mi target filtering values are not less than a statistical value of a target filtering value other than the selected statistical values of the n target filtering values in the statistical values of the Mi target filtering values; and/or determining a statistical value of a target filtering value for each receive beam based on the at least one target filtering value to obtain statistical values of Ni target filtering values, and determining a target processing value based on the statistical values of the Ni target filtering values, where the target processing value is a sum, an average value, or a weighted sum of the statistical values of the Ni target filtering values, or a sum or an average value of a statistical value that is higher than a preset receive threshold and that is in the statistical values of the Ni target filtering values, or a sum or an average value of statistical values of n target filtering values selected from the statistical values of the Ni target filtering values, where the statistical values of the n target filtering values selected from the statistical values of the Ni target filtering values are not less than a statistical value of a target filtering value other than the selected statistical values of the n target filtering values in the statistical values of the Ni target filtering values.

Figure 11:
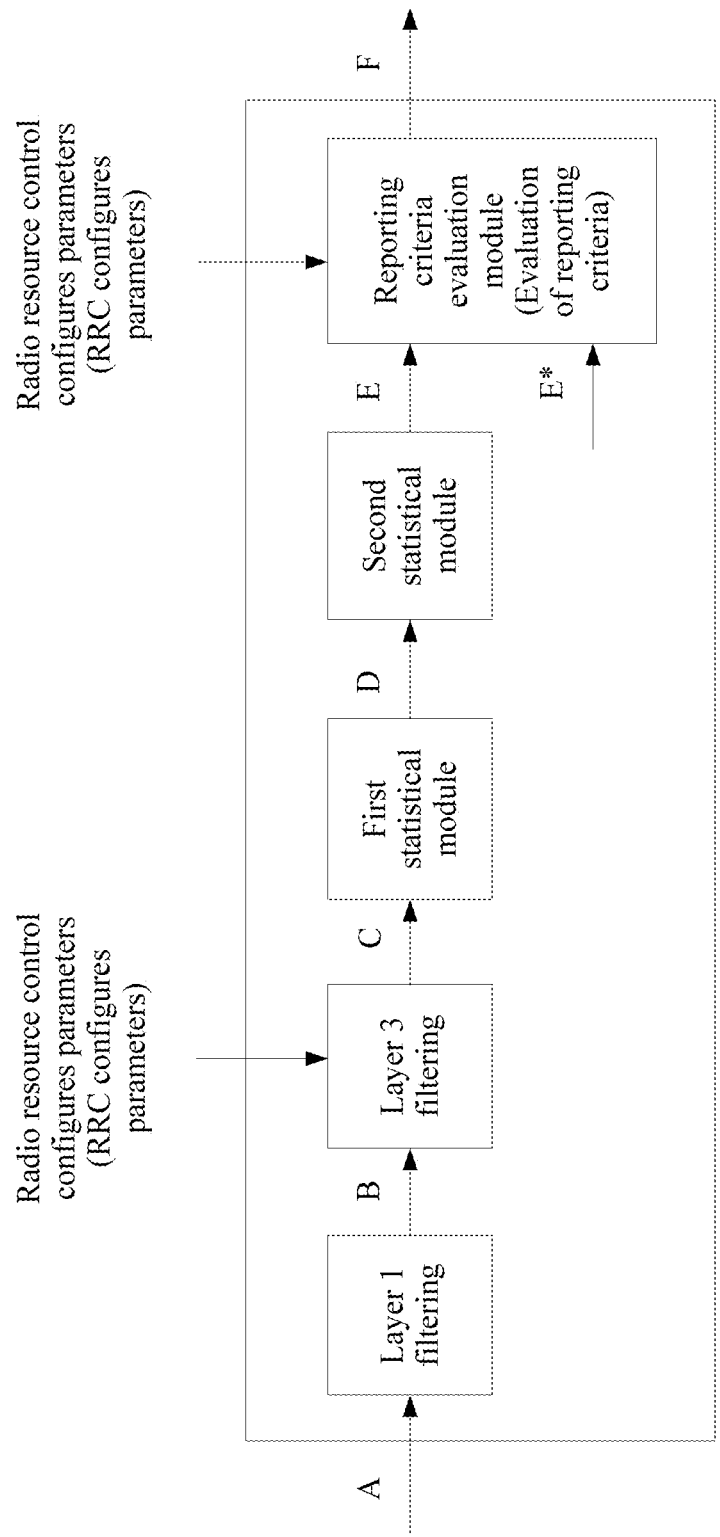
FIG. 11 is a schematic diagram of a fourth measurement model according to an embodiment of the present invention.

Specifically, referring to FIG. 11, at point A, the terminal obtains the at least one group of measurement samples for the ith cell, where each group of measurement samples includes Mi*Ni measurement values.

Layer 1 filtering is performed according to the first filtering rule, to obtain Mi*Ni initial filtering values as initial processing values.

At point B, layer 1 reports the initial processing values processed by layer 1 to layer 3.

Layer 3 filtering is performed. A filtering method used herein is the same as the filtering method in the first measurement model, and repeated content is not described again.

Further, at least one target filtering value is obtained after layer 3 filtering, and is input into a first statistical module at point C.

In the first statistical module, a statistical value for each transmit beam and/or a statistical value for each receive beam are/is generated. A method for producing the statistical value for each transmit beam and/or the statistical value for each receive beam herein is the same as the method for generating the target processing value by the first statistical module in the third measurement model, and repeated content is not described again.

At point D, the statistical value for each transmit beam and/or the statistical value for each receive beam that are/is generated by the first statistical module are/is input to a second statistical module.

In the second statistical module, a target processing value may be generated by using the following nonrestrictive two methods:

For example, statistical values respectively corresponding to transmit beams 1 to 3 are R1, R2, and R3. For the receive beam, the method is the same as the method for processing the transmit beam, and details are not described again.

(1)

$$R=R1+R2+R3 \text{ or } R=(R1+R2+R3)/3$$

(2) First, statistical values of target filtering values that are higher than a preset transmit threshold are selected from the three values, and it is assumed that the statistical values are R1 and R3, then:

$$R=R1+R3 \text{ or } R=(R1+R3)/2$$

(3) The three values are sorted in descending order, and one or more highest statistical values of target filtering values are determined from the three values. It is assumed that one highest statistical value of the target filtering value is selected as R2, then:

$$R=R2$$

At point E, a target processing value obtained after layer 3 filtering is reported to a criteria evaluation module, and a measurement result reported by the terminal at point F is a target processing value that meets a preset reporting rule in the target processing value.

Similarly, E and E* may be represented as that layer 3 separately reports the target processing values for two cells.

In addition, the terminal may alternatively not report, to the base station, the target processing value that meets the preset reporting rule, and use any obtained result at points B to F to evaluate cell quality or report the result to the base station.

Fifth Measurement Model:

An ith cell is used as an example, and when processing the at least one group of measurement samples for each cell to obtain the at least one initial processing value, the terminal performs the following processing for at least one group of measurement samples for the ith cell:

The terminal filters the at least one group of measurement samples for the ith cell according to a first filtering rule, to obtain Mi*Ni initial filtering values; and the terminal determines a statistical value for each transmit beam based on the Mi*Ni initial filtering values to obtain statistical values of Mi initial filtering values as initial processing values, and/or the terminal determines a statistical value for each receive beam based on the Mi*Ni initial filtering values to obtain statistical values of Ni initial filtering values as initial processing values.

The ith cell is still used as an example, and when processing the at least one initial processing value to obtain the at least one target processing value, the terminal performs the following processing for an initial processing value for the ith cell: the terminal filters the at least one initial processing value according to a second filtering rule, to obtain at least one target filtering value as a target processing value.

Figure 12:
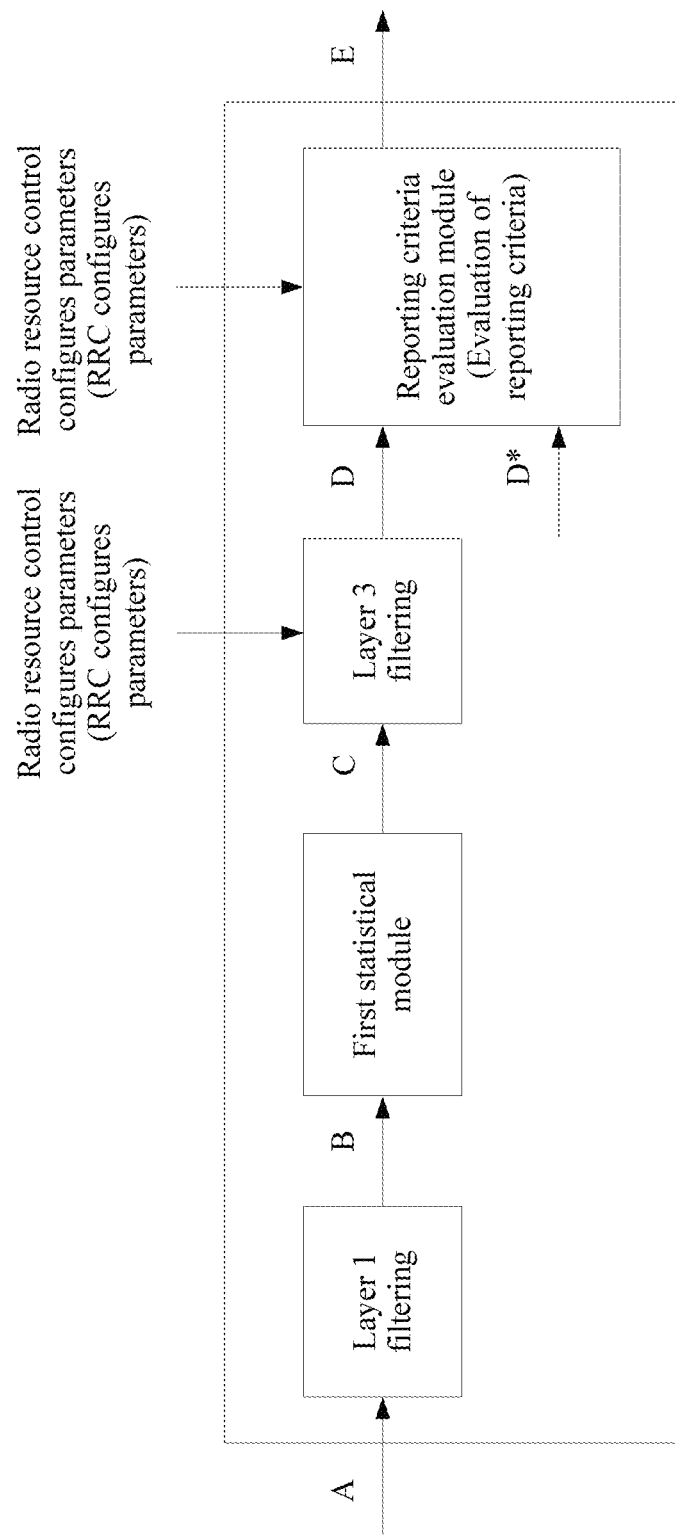
FIG. 12 is a schematic diagram of a fifth measurement model according to an embodiment of the present invention.

Specifically, referring to FIG. 12, at point A, the terminal obtains the at least one group of measurement samples for the ith cell, where each group of measurement samples includes Mi*Ni measurement values.

Layer 1 filtering is performed according to the first filtering rule, to obtain the Mi*Ni initial filtering values.

At point B, the Mi*Ni initial filtering values are input to a first statistical module. In the first statistical module, a statistical value for each transmit beam and/or a statistical value for each receive beam are/is generated. A method for generating the statistical value for each transmit beam and/or the statistical value for each receive beam herein is the same as the method for generating the target processing value by the first statistical module in the third measurement model, and repeated content is not described again.

The statistical value for each transmit beam and/or the statistical value for each receive beam that are/is generated by the first statistical module are/is used as an initial processing value and input to layer 3 at point C.

Layer 3 filtering is performed. A filtering method used herein is the same as the filtering method in the first measurement model, and repeated content is not described again.

At point D, a target processing value obtained after layer 3 filtering is input to a reporting criteria evaluation module, and a measurement result reported by the terminal at point E is a target processing value that meets a preset reporting rule in the target processing value.

Similarly, D and D* may be represented as that layer 3 separately reports the target processing values for two cells. In addition, the terminal may alternatively not report, to the base station, the target processing value that meets the preset reporting rule, and use any obtained result at points B to E to evaluate cell quality or report the result to the base station.

Sixth Measurement Model:

An ith cell is used as an example, and when processing the at least one group of measurement samples for each cell to obtain the at least one initial processing value, the terminal performs the following processing for at least one group of measurement samples for the ith cell:

The terminal filters the at least one group of measurement samples for the ith cell according to a first filtering rule, to obtain Mi*Ni initial filtering values; and the terminal determines a statistical value of an initial filtering value for each transmit beam based on the Mi*Ni initial filtering values to obtain statistical values of Mi initial filtering values as initial processing values, and/or the terminal determines a statistical value of an initial filtering value for each receive beam based on the Mi*Ni initial filtering values to obtain statistical values of Ni initial filtering values as initial processing values.

The ith cell is still used as an example, and when processing the at least one initial processing value to obtain the at least one target processing value, the terminal performs the following processing for initial processing values for the ith cell: when determining that the initial processing values for the ith cell are the statistical values of the Mi initial filtering values, the terminal performs filtering according to a second filtering rule to obtain Mi target filtering values, and determines a target processing value based on the Mi target filtering values, where the target processing value is a sum, an average value, or a weighted sum of the Mi target filtering values, or a sum or an average value of a statistical value that is higher than a preset transmit threshold and that is in the Mi target filtering values, or a sum or an average value of n target filtering values selected from the Mi target filtering values, where the n target filtering values selected from the Mi target filtering values are not less than a target filtering value other than the n selected target filtering values in the Mi target filtering values; or when determining that the initial processing values for the ith cell are the statistical values of the Ni initial filtering values, the terminal performs filtering according to a second filtering rule to obtain Ni target filtering values, and determines a target processing value based on the Ni target filtering values, where the target processing value is a sum, an average value, or a weighted sum of the Ni target filtering values, or a sum or an average value of a statistical value that is higher than a preset receive threshold and that is in the Ni target filtering values, or a sum or an average value of n target filtering values selected from the Ni target filtering values, where the n target filtering values selected from the Ni target filtering values are not less than a target filtering value other than the n selected target filtering values in the Ni target filtering values.

Figure 13:
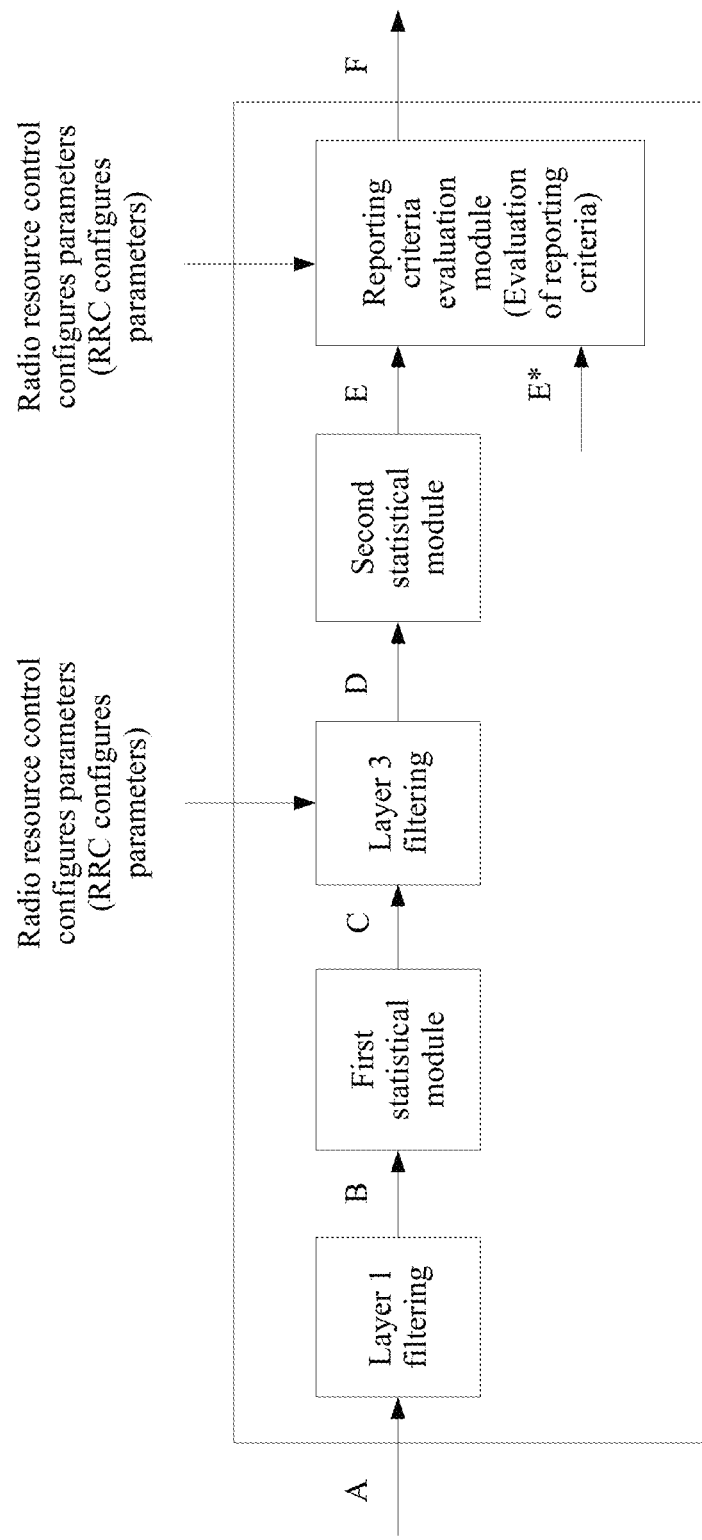
FIG. 13 is a schematic diagram of a sixth measurement model according to an embodiment of the present invention.

Specifically, referring to FIG. 13, at point A, the terminal obtains the at least one group of measurement samples for the ith cell, where each group of measurement samples includes Mi*Ni measurement values.

Layer 1 filtering is performed according to the first filtering rule, to obtain the Mi*Ni initial filtering values.

At point B, the Mi*Ni initial filtering values are input to a first statistical module. In the first statistical module, a statistical value for each transmit beam and/or a statistical value for each receive beam are/is generated. A method for producing the statistical value for each transmit beam and/or the statistical value for each receive beam herein is the same as the method for generating the target processing value by the first statistical module in the third measurement model, and repeated content is not described again.

The statistical value for each transmit beam and/or the statistical value for each receive beam that are/is generated by the first statistical module are/is used as an initial processing value and input to layer 3 at point C.

Layer 3 filtering is performed. A filtering method used herein is the same as the filtering method in the first measurement model, and repeated content is not described again.

At point D, a target filtering value obtained after layer 3 filtering is input to a second statistical module, and a target processing value is generated in the second statistical module. A method used herein for generating the target processing value is the same as the method for generating the target processing value by the second statistical module in the fourth measurement model, and repeated content is not described again.

At point E, the target processing value obtained after processing by the second statistical module is reported to a reporting criteria evaluation module, and a measurement result reported by the terminal at point F is a target processing value that meets a preset reporting rule in the target processing value.

Similarly, E and E* may be represented as that layer 3 separately reports the target processing values for two cells. In addition, the terminal may alternatively not report, to the base station, the target processing value that meets the preset reporting rule, and use any obtained result at points B to E to evaluate cell quality or report the result to the base station.

Seventh Measurement Model:

An ith cell is used as an example, and when processing the at least one group of measurement samples for each cell to obtain the at least one initial processing value, the terminal performs the following processing for at least one group of measurement samples for the ith cell:

The terminal filters a plurality of groups of measurement samples for the ith cell according to a first filtering rule, to obtain $Mi*Ni$ initial filtering values; the terminal determines a statistical value of an initial filtering value for each transmit beam based on the $Mi*Ni$ initial filtering values to obtain statistical values of Mi initial filtering values, and determines an initial processing value based on the statistical values of the Mi initial filtering values, where the initial processing value is a sum, an average value, or a weighted sum of the statistical values of the Mi initial filtering values, or a sum or an average value of a statistical value that is higher than a preset transmit threshold and that is in the statistical values of the Mi initial filtering values, or a sum or an average value of statistical values of n initial filtering values selected from the statistical values of the Mi initial filtering values, where the statistical values of the n initial filtering values selected from the statistical values of the Mi initial filtering values are not less than a statistical value of an initial filtering value other than the selected statistical values of the n initial filtering values in the statistical values of the Mi initial filtering values; and/or the terminal determines a statistical value of an initial filtering value for each receive beam based on the $Mi*Ni$ initial filtering values to obtain statistical values of Ni initial filtering values, and determines an initial processing value based on the statistical value of the Ni initial filtering values, where the initial processing value is a sum, an average value, or a weighted sum of the statistical values of the Ni initial filtering values, or a sum or an average value of a statistical value that is higher than a preset receive threshold and that is in the statistical values of the Ni initial filtering values, or a sum or an average value of statistical values of n initial filtering values selected from the statistical value of the Ni initial filtering values, where the statistical values of the n initial filtering values selected from the statistical values of the Ni initial filtering values are not less than a statistical value of an initial filtering value other than the selected statistical values of the n initial filtering values in the statistical value of the Ni initial filtering values.

The ith cell is still used as an example, and when processing the at least one initial processing value to obtain the at least one target processing value, the terminal performs the following processing for an initial processing value for the ith cell:

The terminal filters the at least one initial processing value according to a second filtering rule, to obtain at least one target filtering value as a target processing value.

Figure 14:
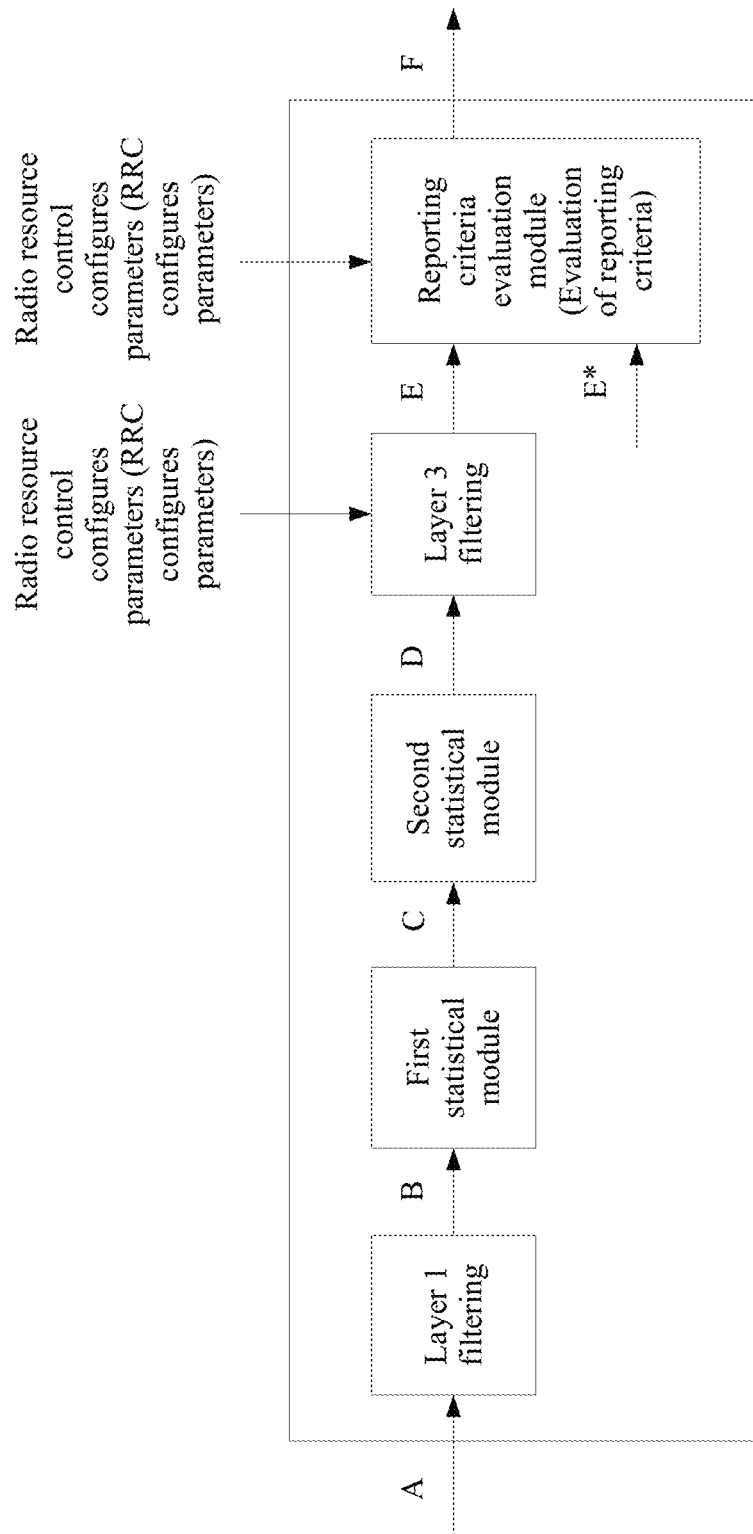
FIG. 14 is a schematic diagram of a seventh measurement model according to an embodiment of the present invention.

Specifically, referring to FIG. 14, at point A, the terminal obtains the at least one group of measurement samples for the ith cell, where each group of measurement samples includes $Mi*Ni$ measurement values.

Layer 1 filtering is performed according to the first filtering rule, to obtain the $Mi*Ni$ initial filtering values.

At point B, the $Mi*Ni$ initial filtering values are input to a first statistical module. In the first statistical module, a statistical value for each transmit beam and/or a statistical value for each receive beam are/is generated. A method for producing the statistical value for each transmit beam and/or the statistical value for each receive beam herein is the same as the method for generating the target processing value by the first statistical module in the third measurement model, and repeated content is not described again.

The statistical value for each transmit beam and/or the statistical value for each receive beam that are/is generated by the first statistical module are/is input to a second statistical module at point C.

In the second statistical module, an initial processing value is generated, and a method used herein for generating the initial processing value is the same as the method for generating the target processing value by the second statistical module in the fourth measurement model, and repeated content is not described again.

At point D, input to layer 3. Layer 3 filtering is performed. A filtering method used herein is the same as the filtering method in the first measurement model, and repeated content is not described again.

At point E, a target processing value obtained after layer 3 filtering is input to a reporting criteria evaluation module, and a measurement result reported by the terminal at point F is a target processing value that meets a preset reporting rule in the target processing value.

Similarly, E and E* may be represented as that layer 3 separately reports the target processing values for two cells. In addition, the terminal may alternatively not report, to the base station, the target processing value that meets the preset reporting rule, and use any obtained result at points B to E to evaluate cell quality or report the result to the base station.

Eighth Measurement Model:

That the terminal processes the at least one group of measurement samples for each cell to obtain the at least one initial processing value includes: performing the following processing for at least one group of measurement samples for the ith cell:

The terminal filters the at least one group of measurement samples for the ith cell according to a first filtering rule, to obtain $Mi*Ni$ initial filtering values; and the terminal calculates a sum or an average value of the $Mi*Ni$ initial filtering values as an initial processing value; or the terminal calculates a sum or an average value of an initial filtering value that is greater than a preset initial processing value threshold and that is in the $Mi*Ni$ initial filtering values, as an initial processing value; or the terminal calculates a sum or an average value of n initial filtering values selected from the $Mi*Ni$ initial filtering values, as an initial processing value, where the n initial filtering values selected from the $Mi*Ni$ initial filtering values are not less than an initial filtering value other than the n selected initial filtering values in the $Mi*Ni$ initial filtering values; or the terminal calculates a weighted sum of the $Mi*Ni$ initial filtering values as an initial processing value based on weights separately corresponding to the $Mi*Ni$ initial filtering values, where a weight of each initial filtering value is configured by the base station or determined by the terminal.

The ith cell is still used as an example, and when processing the at least one initial processing value to obtain the at least one target processing value, the terminal performs the following processing for an initial processing value for the ith cell:

The terminal filters the at least one initial processing value according to a second filtering rule, to obtain at least one target filtering value as a target processing value.

Figure 15:
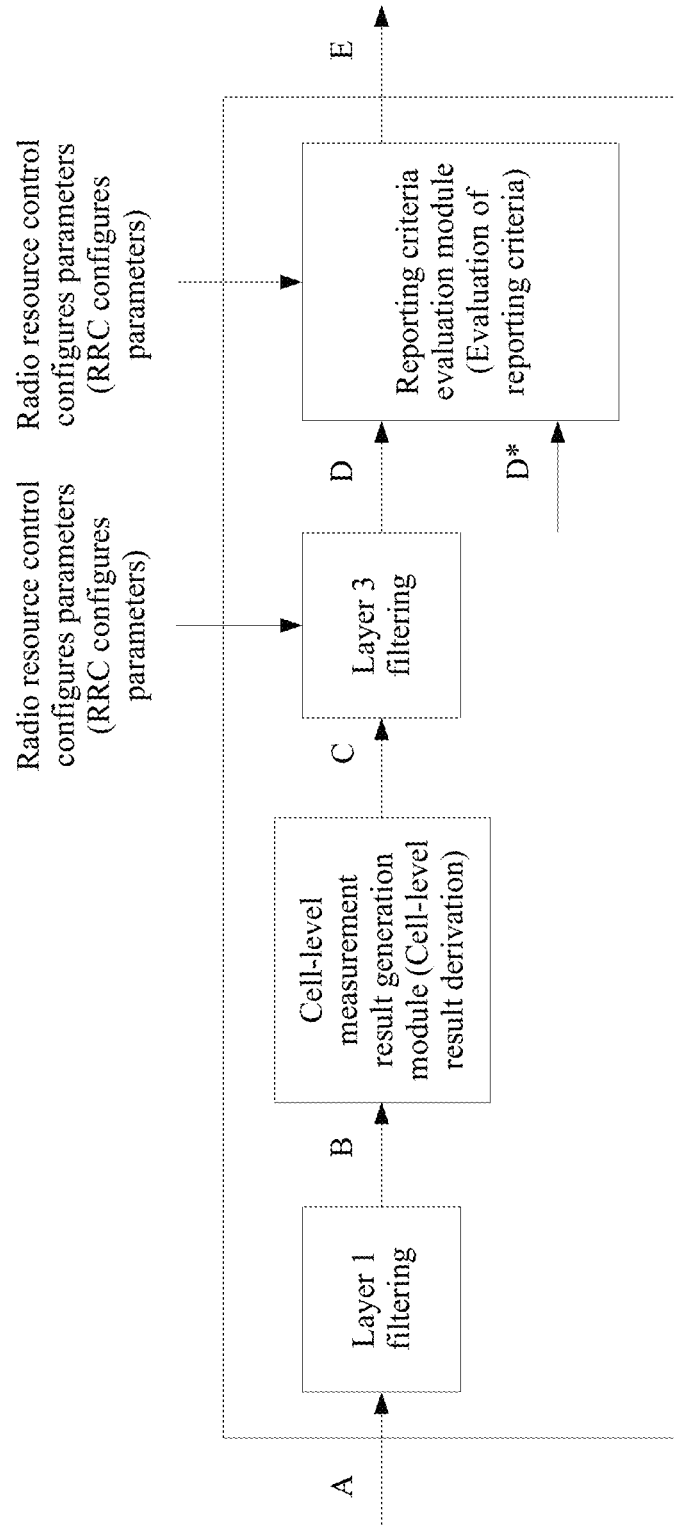
FIG. 15 is a schematic diagram of an eighth measurement model according to an embodiment of the present invention.

Specifically, referring to FIG. 15, at point A, the terminal obtains the at least one group of measurement samples for the ith cell, where each group of measurement samples includes Mi*Ni measurement values.

Layer 1 filtering is performed according to the first filtering rule, to obtain the Mi*Ni initial filtering values.

At point B, the Mi*Ni initial filtering values are input to a cell-level measurement result generation module to generate an initial processing value. A method for generating the initial processing value herein is the same as the method for generating the target processing value by the cell-level measurement result generation module in the second measurement model, and repeated content is not described again.

At point C, the initial processing value generated by the cell-level measurement result generation module is input to layer 3. Layer 3 filtering is performed. A filtering method used herein is the same as the filtering method in the first measurement model, and repeated content is not described again.

At point D, a target processing value obtained after layer 3 filtering is input to a reporting criteria evaluation module, and a measurement result reported by the terminal at point E is a target processing value that meets a preset reporting rule in the target processing value.

Similarly, D and D* may be represented as that layer 3 separately reports the target processing values for two cells. In addition, the terminal may alternatively not report, to the base station, the target processing value that meets the preset reporting rule, and use any obtained result at points B to D to evaluate cell quality or report the result to the base station.

It should be understood that, the first statistical module, the second statistical module, and the cell-level measurement result generation module herein are merely functional division, and may be one or more processing units, and corresponding operations are performed by a processor in the terminal. Therefore, this is not specifically limited herein.

Figure 16:
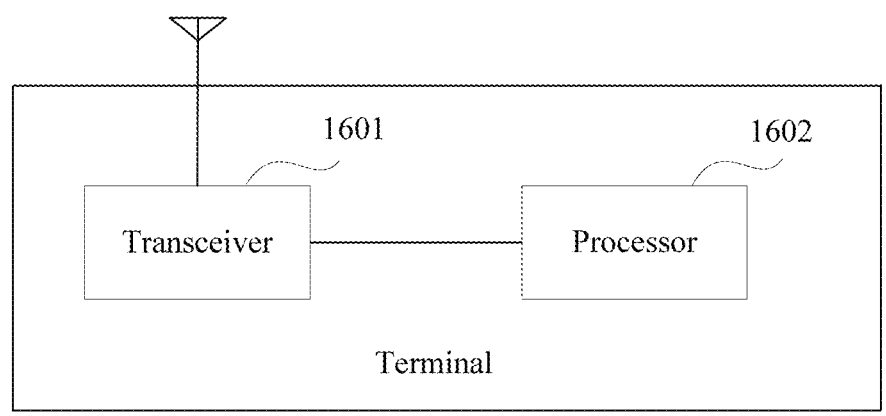
FIG. 16 is a schematic structural diagram of a terminal according to an embodiment of the present invention.

Referring to FIG. 16, an embodiment of the present invention provides a terminal, including a transceiver 1601 and a processor 1602 coupled to the transceiver 1601.

The processor 1602 is configured to: receive, on a receive beam for each cell by using the transceiver, a reference signal sent on a transmit beam of a corresponding cell, and measure the received reference signal to obtain at least one group of measurement samples for each cell; process the at least one group of measurement samples for each cell to obtain at least one initial processing value; process the at least one initial processing value to obtain at least one target processing value; and report, by using the transceiver 1601, a target processing value that meets a preset reporting rule in the at least one target processing value to a base station as a measurement result, or use the target processing value to evaluate cell quality.

In a possible implementation, if a quantity of cell transmit beams measured for an ith cell is Mi, and a quantity of receive beams for the ith cell is Ni, each group of measurement samples for the ith cell includes Mi*Ni measurement values, and both Mi and Ni are positive integers greater than or equal to 1.

In a possible implementation, processing the at least one group of measurement samples for each cell means processing the at least one group of measurement samples for each cell at a physical layer; and/or processing the at least one initial processing value means processing the at least one initial processing value at an RRC layer.

In a possible implementation, the method for obtaining the at least one initial processing value and/or the method for obtaining the at least one target processing value are/is notified by the base station to the terminal by using preset signaling, where the preset signaling is at least one of RRC signaling, a MAC control element, or physical layer signaling.

In a possible implementation, the processor is further configured to: after processing the at least one group of measurement samples for each cell to obtain the at least one initial processing value, report the at least one initial processing value to the base station or use the at least one initial processing value by the terminal itself to evaluate cell quality.

In a possible implementation, the processor is further configured to: after processing the at least one initial processing value to obtain the at least one target processing value, report the at least one target processing value to the base station or use the at least one target processing value by the terminal itself to evaluate cell quality.

In a possible implementation, the processor 1602 is specifically configured to: when processing the at least one group of measurement samples for each cell to obtain the at least one initial processing value, perform the following processing for at least one group of measurement samples for the ith cell: filtering the at least one group of measurement samples for the ith cell according to a first filtering rule, to obtain Mi*Ni initial filtering values as initial processing values.

In a possible implementation, the processor 1602 is specifically configured to: when processing the at least one initial processing value to obtain the at least one target processing value, perform the following processing for an initial processing value for the ith cell: filtering the initial processing value for the ith cell according to a second filtering rule, to obtain at least one target filtering value; and calculating a sum or an average value of the at least one target filtering value as a target processing value; or calculating a sum or an average value of a target filtering value that is in the at least one target filtering value and that is greater than a preset target filtering value threshold, as a target processing value; or calculating a sum or an average value of n target filtering values selected from the at least one target filtering value, as a target processing value, where the n selected target filtering values are not less than a target filtering value other than the n selected target filtering values in the at least one target filtering value, and n≥1; or calculating a weighted sum of the at least one target filtering value as a target processing value based on a weight corresponding to the at least one target filtering value, where a weight of each target filtering value is configured by the base station or determined by the terminal.

In a possible implementation, the processor 1602 is specifically configured to: when processing the at least one initial processing value to obtain the at least one target processing value, perform the following processing for an initial processing value for the ith cell: filtering the initial processing value for the ith cell according to a second filtering rule, to obtain at least one target filtering value, and determining a statistical value for each transmit beam based on the at least one target filtering value to obtain statistical values of Mi target filtering values as target processing values; and/or determining a statistical value for each receive beam based on the at least one target filtering value to obtain statistical values of Ni target filtering values as target processing values.

In a possible implementation, the processor 1602 is specifically configured to: when processing the at least one initial processing value to obtain the at least one target processing value, perform the following processing for an initial processing value for the ith cell: filtering the initial processing value for the ith cell according to a second filtering rule, to obtain at least one target filtering value; and perform the following processing based on the at least one target filtering value: determining a statistical value of a target filtering value for each transmit beam based on the at least one target filtering value to obtain statistical values of Mi target filtering values, and determining a target processing value based on the statistical values of the Mi target filtering values, where the target processing value is a sum, an average value, or a weighted sum of the statistical values of the Mi target filtering values, or a sum or an average value of a statistical value that is higher than a preset transmit threshold and that is in the statistical values of the Mi target filtering values, or a sum or an average value of statistical values of n target filtering values selected from the statistical values of the Mi target filtering values, where the statistical values of the n target filtering values selected from the statistical values of the Mi target filtering values are not less than a statistical value of a target filtering value other than the selected statistical values of the n target filtering values in the statistical values of the Mi target filtering values; and/or determining a statistical value of a target filtering value for each receive beam based on the at least one target filtering value to obtain statistical values of Ni target filtering values, and determining a target processing value based on the statistical values of the Ni target filtering values, where the target processing value is a sum, an average value, or a weighted sum of the statistical values of the Ni target filtering values, or a sum or an average value of a statistical value that is higher than a preset receive threshold and that is in the statistical values of the Ni target filtering values, or a sum or an average value of statistical values of n target filtering values selected from the statistical values of the Ni target filtering values, where the statistical values of the n target filtering values selected from the statistical values of the Ni target filtering values are not less than a statistical value of a target filtering value other than the selected statistical values of the n target filtering values in the statistical values of the Ni target filtering values.

In a possible implementation, the processor 1602 is specifically configured to: when processing the at least one group of measurement samples for each cell to obtain the at least one initial processing value, perform the following processing for at least one group of measurement samples for the ith cell: filtering a plurality of groups of measurement samples for the ith cell according to a first filtering rule, to obtain Mi*Ni initial filtering values; determining a statistical value of an initial filtering value for each transmit beam based on the Mi*Ni initial filtering values to obtain statistical values of Mi initial filtering values as initial processing values, and/or determining a statistical value of an initial filtering value for each receive beam based on the Mi*Ni initial filtering values to obtain statistical values of Ni initial filtering values as initial processing values.

In a possible implementation, the processor 1602 is specifically configured to: when processing the at least one initial processing value to obtain the at least one target processing value, perform the following processing for initial processing values for the ith cell: when determining that the initial processing values for the ith cell are the statistical values of the Mi initial filtering values, performing filtering according to a second filtering rule to obtain Mi target filtering values, and determining a target processing value based on the Mi target filtering values, where the target processing value is a sum or an average value of the Mi target filtering values, or a sum or an average value of a statistical value that is higher than a preset transmit threshold and that is in the Mi target filtering values, or a sum or an average value of n target filtering values selected from the Mi target filtering values, where the n target filtering values selected from the Mi target filtering values are not less than a target filtering value other than the n selected target filtering values in the Mi target filtering values; or when determining that the initial processing values for the ith cell are the statistical values of the Ni initial filtering values, performing filtering according to a second filtering rule to obtain Ni target filtering values, and determining a target processing value based on the Ni target filtering values, where the target processing value is a sum or an average value of the Ni target filtering values, or a sum or an average value of a statistical value that is higher than a preset receive threshold and that is in the Ni target filtering values, or a sum or an average value of n target filtering values selected from the Ni target filtering values, where the n target filtering values selected from the Ni target filtering values are not less than a target filtering value other than the n selected target filtering values in the Ni target filtering values.

In a possible implementation, the processor 1602 is specifically configured to: when processing the at least one group of measurement samples for each cell to obtain the at least one initial processing value, perform the following processing for at least one group of measurement samples for the ith cell: filtering a plurality of groups of measurement samples for the ith cell according to a first filtering rule, to obtain Mi*Ni initial filtering values; determining a statistical value of an initial filtering value for each transmit beam based on the Mi*Ni initial filtering values to obtain statistical values of Mi initial filtering values, and determining an initial processing value based on the statistical values of the Mi initial filtering values, where the initial processing value is a sum, an average value, or a weighted sum of the statistical values of the Mi initial filtering values, or a sum or an average value of a statistical value that is higher than a preset transmit threshold and that is in the statistical values of the Mi initial filtering values, or a sum or an average value of statistical values of n initial filtering values selected from the statistical values of the Mi initial filtering values, where the statistical values of the n initial filtering values selected from the statistical values of the Mi initial filtering values are not less than a statistical value of an initial filtering value other than the selected statistical values of the n initial filtering values in the statistical values of the Mi initial filtering values; and/or determining a statistical value of an initial filtering value for each receive beam based on the Mi*Ni initial filtering values to obtain statistical values of Ni initial filtering values, and determining an initial processing value based on the statistical values of the Ni initial filtering values, where the initial processing value is a sum, an average value, or a weighted sum of the statistical values of the Ni initial filtering values, or a sum or an average value of a statistical value that is higher than a preset receive threshold and that is in the statistical values of the Ni initial filtering values, or a sum or an average value of statistical values of n initial filtering values selected from the statistical values of the Ni initial filtering values, where the statistical values of the n initial filtering values selected from the statistical values of the Ni initial filtering values are not less than a statistical value of an initial filtering value other than the selected statistical values of the n initial filtering values in the statistical values of the Ni initial filtering values.

In a possible implementation, the processor is specifically configured to: when processing the at least one group of measurement samples for each cell to obtain the at least one initial processing value, perform the following processing for at least one group of measurement samples for the ith cell: filtering the at least one group of measurement samples for the ith cell according to a first filtering rule, to obtain Mi*Ni initial filtering values; and calculating a sum or an average value of the Mi*Ni initial filtering values as an initial processing value; or calculating, by the terminal, a sum or an average value of an initial filtering value that is greater than a preset initial processing value threshold and that is in the Mi*Ni initial filtering values, as an initial processing value; or calculating a sum or an average value of n initial filtering values selected from the Mi*Ni initial filtering values, as an initial processing value, where the n initial filtering values selected from the Mi*Ni initial filtering values are not less than an initial filtering value other than the n selected initial filtering values in the Mi*Ni initial filtering values; or calculating, by the terminal, a weighted sum of the Mi*Ni initial filtering values as an initial processing value based on weights separately corresponding to the Mi*Ni initial filtering values, where a weight of each initial filtering value is configured by the base station or determined by the terminal.

In a possible implementation, the processor 1602 is specifically configured to: when processing the at least one initial processing value to obtain the at least one target processing value, filter the at least one initial processing value according to a second filtering rule, to obtain at least one target filtering value as a target processing value.

In a possible implementation, the second filtering rule is:

$$Fn=\text{Function}(Fn-1, Mn, Mn-1);$$

where Fn is a target filtering value obtained after current filtering, Fn−1 is a target filtering value obtained after previous filtering, Mn is an initial processing value reported current time at the physical layer, and Mn−1 is an initial processing value reported previous time at the physical layer.

In conclusion, according to the method provided in the embodiments of the present invention, the terminal may obtain a measurement sample for a beam combination, generate a cell-level measurement result or a beam-level measurement result, and report the measurement result to the base station or use the measurement result to evaluate cell quality. Compared with the prior art, in the method provided in the embodiments of the present invention, a beamforming operation in a high-frequency scenario is considered, measurement samples are obtained for different beam combinations, and filtering and calculation are performed, so that a generated measurement result is more accurate, and the base station can learn of quality of each cell and/or a channel state of a beam, and determine, based on the measurement result reported by the terminal, whether the terminal needs to perform operations such as cell addition, cell deletion, and a cell handover.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory (English: non-transitory) medium, such as a random access memory, read-only memory, a flash memory, a hard disk, a solid state drive, a magnetic tape (English: magnetic tape), a floppy disk (English: floppy disk), an optical disc (English: optical disc), or any combination thereof.

The present invention is described with reference to the flowcharts and/or block diagrams of the method and the device according to the embodiments of the present invention. It should be understood that computer program instructions may be used to implement each process or each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and in one or more blocks in the block diagrams.

The foregoing descriptions are merely examples of embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
receiving, by a terminal using one or more receive beams of one or more cells, one or more reference signals, wherein each reference signal of the one or more reference signals is received on a respective receive beam of the one or more receive beams, and each reference signal of the one or more reference signals is sent on a respective transmit beam of a corresponding cell;
measuring each of the one or more reference signals to obtain one or more groups of measurement samples, wherein a respective group of measurement samples of the one or more groups of measurement samples corresponds to each cell of the one or more cells;
processing, by the terminal, the one or more groups of measurement samples to obtain one or more initial processing values, wherein a respective initial processing value of the one or more initial processing values corresponds to each of group of measurement samples of the one or more groups of measurement samples;
processing, by the terminal, the one or more initial processing values to obtain one or more target processing values, wherein a respective target processing value of the one or more target processing values corresponds to each initial processing value of the one or more initial processing values; and
reporting, by the terminal, a first target processing value of the one or more target processing values that meets a preset reporting rule to a base station as a measurement result, or using, by the terminal, the first target processing value to evaluate cell quality.

2. The method according to claim 1, wherein processing, by the terminal, the one or more groups of measurement samples comprises processing, by the terminal, the one or more groups of measurement samples at a physical layer.

3. The method according to claim 1, wherein after processing, by the terminal, the one or more groups of measurement samples to obtain the one or more initial processing values, the method further comprises:
reporting, by the terminal, the one or more initial processing values to the base station; or
using, by the terminal, the one or more initial processing values to evaluate cell quality.

4. The method according to claim 1, wherein after processing, by the terminal, the one or more initial processing values to obtain the one or more target processing values, the method further comprises:
reporting, by the terminal, the one or more target processing values to the base station; or
using, by the terminal, the one or more target processing values to evaluate cell quality.

5. The method according to claim 1, wherein:
a quantity of transmit beams measured by the terminal for an ith cell is Mi;
a quantity of receive beams of the terminal for the ith cell is Ni; and
each group of measurement samples for the ith cell comprises Mi*Ni measurement values, wherein both Mi and Ni are positive integers greater than or equal to 1.

6. The method according to claim 5, wherein processing, by the terminal, the one or more groups of measurement samples to obtain the one or more initial processing values comprises:
performing the following processing for at least one group of measurement samples for the ith cell:
filtering, by the terminal, the at least one group of measurement samples for the ith cell according to a first filtering rule, to obtain Mi*Ni initial filtering values as initial processing values.

7. The method according to claim 6, wherein processing, by the terminal, the one or more initial processing values to obtain the one or more target processing values comprises:
performing the following processing for an initial processing value for the ith cell:
filtering, by the terminal, the initial processing value for the ith cell according to a second filtering rule, to obtain at least one target filtering value; and
calculating, by the terminal, a sum or an average value of the at least one target filtering value as a second target processing value; or calculating, by the terminal, a sum or an average value of a target filtering value that is in the at least one target filtering value and that is greater than a preset target filtering value threshold, as a third target processing value; or calculating, by the terminal, a sum or an average value of n target filtering values selected from the at least one target filtering value, as a fourth target processing value, wherein the n selected target filtering values are not less than a target filtering value other than the n selected target filtering values in the at least one target filtering value, and n≥1; or calculating, by the terminal, a weighted sum of the at least one target filtering value as a fifth target processing value based on a weight corresponding to the at least one target filtering value, wherein a weight of each target filtering value is configured by the base station or determined by the terminal.

8. The method according to claim 6, wherein processing, by the terminal, the one or more initial processing values to obtain the one or more target processing values comprises:
performing the following processing for an initial processing value for the ith cell:
filtering, by the terminal, the initial processing value for the ith cell according to a second filtering rule, to obtain at least one target filtering value, and determining a statistical value for each transmit beam corresponding to the ith cell based on the at least one target filtering value to obtain statistical values of Mi target filtering values as first target processing values; or
determining a statistical value for each receive beam of the ith cell based on the at least one target filtering value to obtain statistical values of Ni target filtering values as second target processing values.

9. The method according to claim 6, wherein processing, by the terminal, the one or more initial processing values to obtain the one or more target processing values comprises:
performing the following processing for an initial processing value for the ith cell:
filtering, by the terminal, the initial processing value for the ith cell according to a second filtering rule, to obtain at least one target filtering value; and
performing the following processing based on the at least one target filtering value:
determining a statistical value of a target filtering value for each transmit beam corresponding to the ith cell based on the at least one target filtering value to obtain statistical values of Mi target filtering values, and determining a second target processing value based on the statistical values of the Mi target filtering values, wherein the second target processing value is a sum, an average value, or a weighted sum of the statistical values of the Mi target filtering values, or a sum or an average value of a statistical value that is higher than a preset transmit threshold and that is in the statistical values of the Mi target filtering values, or a sum or an average value of statistical values of n target filtering values selected from the statistical values of the Mi target filtering values, wherein the statistical values of the n target filtering values selected from the statistical values of the Mi target filtering values are not less than a statistical value of a target filtering value other than the selected statistical values of the n target filtering values in the statistical values of the Mi target filtering values; or
determining a statistical value of a target filtering value for each receive beam of the ith cell based on the at least one target filtering value to obtain statistical values of Ni target filtering values, and determining a third target processing value based on the statistical values of the Ni target filtering values, wherein the third target processing value is a sum, an average value, or a weighted sum of the statistical values of the Ni target filtering values, or a sum or an average value of a statistical value that is higher than a preset receive threshold and that is in the statistical values of the Ni target filtering values, or a sum or an average value of statistical values of n target filtering values selected from the statistical values of the Ni target filtering values, wherein the statistical values of the n target filtering values selected from the statistical values of the Ni target filtering values are not less than a statistical value of a target filtering value other than the selected statistical values of the n target filtering values in the statistical values of the Ni target filtering values.

10. The method according to claim 5, wherein processing, by the terminal, the one or more groups of measurement samples to obtain the one or more initial processing values comprises:
performing the following processing for at least one group of measurement samples for the ith cell:
filtering, by the terminal, a plurality of groups of measurement samples for the ith cell according to a first filtering rule, to obtain Mi*Ni initial filtering values; and
determining, by the terminal, a statistical value of an initial filtering value for each transmit beam corresponding to the ith cell based on the Mi*Ni initial filtering values to obtain statistical values of Mi initial filtering values as first initial processing values, or determining, by the terminal, a statistical value of an initial filtering value for each receive beam of the ith cell based on the Mi*Ni initial filtering values to obtain statistical values of Ni initial filtering values as second initial processing values.

11. A terminal, comprising:
at least one processor; and
a non-transitory memory coupled to the at least one processor and storing programming instructions that are configured to be executed by the at least one processor, the programming instructions including instructions for:
receiving, using one or more receive beams of one or more cells, one or more references signals, wherein each reference signal of the one or more reference signals is received on a respective receive beam of the one or more receive beams, and each reference signal of the one or more reference signals is sent on a respective transmit beam of a corresponding cell;
measuring each of the one or more reference signals to obtain one or more groups of measurement samples, wherein a respective group of measurement samples of the one or more groups of measurement samples corresponds to each cell of the one or more cells;
processing the one or more groups of measurement samples to obtain one or more initial processing values, wherein a respective initial processing value of the one or more initial processing values corresponds to each of group of measurement samples of the one or more groups of measurement samples;
processing the one or more initial processing values to obtain one or more target processing values, wherein a respective target processing value of the one or more target processing values corresponds to each initial processing value of the one or more initial processing values; and
reporting a first target processing value of the one or more target processing values that meets a preset reporting rule to a base station as a measurement result, or using, by the terminal, the first target processing value to evaluate cell quality.

12. The terminal according to claim 11, wherein processing the one or more initial processing values comprises processing the one or more initial processing values at a radio resource control (RRC) layer.

13. The terminal according to claim 11, wherein:
a quantity of cell transmit beams measured for an ith cell is Mi;
a quantity of receive beams for the ith cell is Ni; and
each group of measurement samples for the ith cell comprises Mi*Ni measurement values, wherein both Mi and Ni are positive integers greater than or equal to 1.

14. The terminal according to claim 13, wherein processing the one or more groups of measurement samples to obtain the one or more initial processing values comprises:
performing the following processing for at least one group of measurement samples for the ith cell:
filtering the at least one group of measurement samples for the ith cell according to a first filtering rule, to obtain Mi*Ni initial filtering values as initial processing values.

15. The terminal according to claim 14, wherein the programming instructions include instructions for:
performing the following processing for an initial processing value for the ith cell:
filtering the initial processing value for the ith cell according to a second filtering rule, to obtain at least one target filtering value; and
calculating a sum or an average value of the at least one target filtering value as a second target processing value; or calculating a sum or an average value of a target filtering value that is in the at least one target filtering value and that is greater than a preset target filtering value threshold, as a third target processing value; or calculating a sum or an average value of n target filtering values selected from the at least one target filtering value, as a fourth target processing value, wherein the n selected target filtering values are not less than a target filtering value other than the n selected target filtering values in the at least one target filtering value, and n≥1; or calculating a weighted sum of the at least one target filtering value as a fifth target processing value based on a weight corresponding to the at least one target filtering value, wherein a weight of each target filtering value is configured by the base station or determined by the terminal.

16. The terminal according to claim 14, wherein the programming instructions include instructions for:
performing the following processing for an initial processing value for the ith cell:
filtering the initial processing value for the ith cell according to a second filtering rule, to obtain at least one target filtering value, and determining a statistical value for each transmit beam corresponding to the ith cell based on the at least one target filtering value to obtain statistical values of Mi target filtering values as first target processing values; or
determining a statistical value for each receive beam of the ith cell based on the at least one target filtering value to obtain statistical values of Ni target filtering values as second target processing values.

17. The terminal according to claim 14, wherein the programming instructions include instructions for:
performing the following processing for an initial processing value for the ith cell:
filtering the initial processing value for the ith cell according to a second filtering rule, to obtain at least one target filtering value; and
performing the following processing based on the at least one target filtering value:
determining a statistical value of a target filtering value for each transmit beam corresponding to the ith cell based on the at least one target filtering value to obtain statistical values of Mi target filtering values, and determining a second target processing value based on the statistical values of the Mi target filtering values, wherein the second target processing value is a sum, an average value, or a weighted sum of the statistical values of the Mi target filtering values, or a sum or an average value of a statistical value that is higher than a preset transmit threshold and that is in the statistical values of the Mi target filtering values, or a sum or an average value of statistical values of n target filtering values selected from the statistical values of the Mi target filtering values, wherein the statistical values of the n target filtering values selected from the statistical values of the Mi target filtering values are not less than a statistical value of a target filtering value other than the selected statistical values of the n target filtering values in the statistical values of the Mi target filtering values; or determining a statistical value of a target filtering value for each receive beam of the ith cell based on the at least one target filtering value to obtain statistical values of Ni target filtering values, and determining a third target processing value based on the statistical values of the Ni target filtering values, wherein the third target processing value is a sum, an average value, or a weighted sum of the statistical values of the Ni target filtering values, or a sum or an average value of a statistical value that is higher than a preset receive threshold and that is in the statistical values of the Ni target filtering values, or a sum or an average value of statistical values of n target filtering values selected from the statistical values of the Ni target filtering values, wherein the statistical values of the n target filtering values selected from the statistical values of the Ni target filtering values are not less than a statistical value of a target filtering value other than the selected statistical values of the n target filtering values in the statistical values of the Ni target filtering values.

18. The terminal according to claim 13, wherein the programming instructions include instructions for:
performing the following processing for at least one group of measurement samples for the ith cell:
filtering a plurality of groups of measurement samples for the ith cell according to a first filtering rule, to obtain Mi*Ni initial filtering values; and
determining a statistical value of an initial filtering value for each transmit beam corresponding to the ith cell based on the Mi*Ni initial filtering values to obtain statistical values of Mi initial filtering values as first initial processing values, or determining a statistical value of an initial filtering value for each receive beam of the ith cell based on the Mi*Ni initial filtering values to obtain statistical values of Ni initial filtering values as second initial processing values.

19. The terminal according to claim 18, wherein the programming instructions include instructions for:
perform the following processing for initial processing values for the ith cell:
when determining that the initial processing values for the ith cell are the statistical values of the Mi initial filtering values, performing filtering according to a second filtering rule to obtain Mi target filtering values, and determining a second target processing value based on the Mi target filtering values, wherein the second target processing value is a sum, an average value, or a weighted sum of the Mi target filtering values, or a sum or an average value of a statistical value that is higher than a preset transmit threshold and that is in the Mi target filtering values, or a sum or an average value of n target filtering values selected from the Mi target filtering values, wherein the n target filtering values selected from the Mi target filtering values are not less than a target filtering value other than the n selected target filtering values in the Mi target filtering values; or when determining that the initial processing values for the ith cell are the statistical values of the Ni initial filtering values, performing filtering according to a second filtering rule to obtain Ni target filtering values, and determining a third target processing value based on the Ni target filtering values, wherein the third target processing value is a sum, an average value, or a weighted sum of the Ni target filtering values, or a sum or an average value of a statistical value that is higher than a preset receive threshold and that is in the Ni target filtering values, or a sum or an average value of n target filtering values selected from the Ni target filtering values, wherein the n target filtering values selected from the Ni target filtering values are not less than a target filtering value other than the n selected target filtering values in the Ni target filtering values.

20. The terminal according to claim 13, wherein the programming instructions include instructions for:
perform the following processing for at least one group of measurement samples for the ith cell:
filtering a plurality of groups of measurement samples for the ith cell according to a first filtering rule, to obtain Mi*Ni initial filtering values;
determining a statistical value of an initial filtering value for each transmit beam corresponding to the ith cell based on the Mi*Ni initial filtering values to obtain statistical values of Mi initial filtering values, and determining a first initial processing value based on the statistical values of the Mi initial filtering values, wherein the first initial processing value is a sum, an average value, or a weighted sum of the statistical values of the Mi initial filtering values, or a sum or an average value of a statistical value that is higher than a preset transmit threshold and that is in the statistical values of the Mi initial filtering values, or a sum or an average value of statistical values of n initial filtering values selected from the statistical values of the Mi initial filtering values, wherein the statistical values of the n initial filtering values selected from the statistical values of the Mi initial filtering values are not less than a statistical value of an initial filtering value other than the selected statistical values of the n initial filtering values in the statistical values of the Mi initial filtering values; or determining a statistical value of an initial filtering value for each receive beam of the ith cell based on the Mi*Ni initial filtering values to obtain statistical values of Ni initial filtering values, and determining a second initial processing value based on the statistical values of the Ni initial filtering values, wherein the second initial processing value is a sum, an average value, or a weighted sum of the statistical values of the Ni initial filtering values, or a sum or an average value of a statistical value that is higher than a preset receive threshold and that is in the statistical values of the Ni initial filtering values, or a sum or an average value of statistical values of n initial filtering values selected from the statistical values of the Ni initial filtering values, wherein the statistical values of the n initial filtering values selected from the statistical values of the Ni initial filtering values are not less than a statistical value of an initial filtering value other than the selected statistical values of the n initial filtering values in the statistical values of the Ni initial filtering values.

\* \* \* \* \*